United States Patent
Mauchly et al.

(10) Patent No.: US 8,797,377 B2
(45) Date of Patent: Aug. 5, 2014

(54) METHOD AND SYSTEM FOR VIDEOCONFERENCE CONFIGURATION

(75) Inventors: J. William Mauchly, Berwyn, PA (US); David W. Sowa, Exton, PA (US)

(73) Assignee: Cisco Technology, Inc., San Jose, CA (US)

( * ) Notice: Subject to any disclaimer, the term of this patent is extended or adjusted under 35 U.S.C. 154(b) by 1434 days.

(21) Appl. No.: 12/031,169

(22) Filed: Feb. 14, 2008

(65) Prior Publication Data

US 2009/0207233 A1 Aug. 20, 2009

(51) Int. Cl.
*H04N 7/14* (2006.01)

(52) U.S. Cl.
USPC ....................................... 348/14.08

(58) Field of Classification Search
USPC .................. 348/14.01–14.09, 14.1, 14.11
See application file for complete search history.

(56) References Cited

U.S. PATENT DOCUMENTS

| | | | |
|---|---|---|---|
| 2,911,462 A | 11/1959 | Brady | |
| D212,798 S | 11/1968 | Dreyfuss | |
| 3,793,489 A | 2/1974 | Sank | |
| 3,909,121 A | 9/1975 | De Mesquita Cardoso | |
| D270,271 S | 8/1983 | Steele | |
| 4,400,724 A | 8/1983 | Fields | |
| 4,473,285 A | 9/1984 | Winter | |
| 4,494,144 A | 1/1985 | Brown | |
| 4,750,123 A | 6/1988 | Christian | |
| 4,815,132 A | 3/1989 | Minami | |
| 4,827,253 A | 5/1989 | Maltz | |
| 4,853,764 A | 8/1989 | Sutter | |
| 4,890,314 A | 12/1989 | Judd et al. | |
| 4,961,211 A | 10/1990 | Tsugane et al. | |
| 4,994,912 A | 2/1991 | Lumelsky et al. | |
| 5,003,532 A | 3/1991 | Ashida et al. | |
| 5,020,098 A | 5/1991 | Celli | |
| 5,033,969 A | 7/1991 | Kamimura | |
| 5,136,652 A | 8/1992 | Jibbe et al. | |
| 5,187,571 A | 2/1993 | Braun et al. | |
| 5,200,818 A | 4/1993 | Neta et al. | |
| 5,243,697 A | 9/1993 | Hoeber et al. | |
| 5,249,035 A | 9/1993 | Yamanaka | |
| 5,255,211 A | 10/1993 | Redmond | |

(Continued)

FOREIGN PATENT DOCUMENTS

| | | |
|---|---|---|
| CN | 101953158 A | 1/2011 |
| CN | 102067593 | 5/2011 |

(Continued)

OTHER PUBLICATIONS

Arrington, Michael, "eJamming—Distributed Jamming," TechCrunch; Mar. 16, 2006; http://www.techcrunch.com/2006/03/16/ejamming-distributed-jamming/; 1 page.

(Continued)

*Primary Examiner* — Brandon Miller
(74) *Attorney, Agent, or Firm* — Patent Capital Group

(57) ABSTRACT

Systems and methods for providing camera configuration for points in a multi-point videoconference system are provided. First configuration information is determined for a first point of a multi-point videoconferencing system. Second configuration information is determined for a second point of the multi-point videoconferencing system. One or more first cameras at the first point or one or more second cameras at the second point of the multi-point videoconferencing system are reconfigured based on the first configuration information or the second configuration information.

22 Claims, 8 Drawing Sheets

(56) References Cited

U.S. PATENT DOCUMENTS

| | | |
|---|---|---|
| D341,848 S | 11/1993 | Bigelow et al. |
| 5,268,734 A | 12/1993 | Parker et al. |
| 5,317,405 A | 5/1994 | Kuriki et al. |
| 5,337,363 A | 8/1994 | Platt |
| 5,347,363 A | 9/1994 | Yamanaka |
| 5,351,067 A | 9/1994 | Lumelsky et al. |
| 5,359,362 A | 10/1994 | Lewis et al. |
| D357,468 S | 4/1995 | Rodd |
| 5,406,326 A | 4/1995 | Mowry |
| 5,423,554 A | 6/1995 | Davis |
| 5,446,834 A | 8/1995 | Deering |
| 5,448,287 A | 9/1995 | Hull |
| 5,467,401 A | 11/1995 | Nagamitsu et al. |
| 5,495,576 A | 2/1996 | Ritchey |
| 5,502,481 A | 3/1996 | Dentinger et al. |
| 5,502,726 A | 3/1996 | Fischer |
| 5,506,604 A | 4/1996 | Nally et al. |
| 5,532,737 A | 7/1996 | Braun |
| 5,541,639 A | 7/1996 | Takatsuki et al. |
| 5,541,773 A | 7/1996 | Kamo et al. |
| 5,570,372 A | 10/1996 | Shaffer |
| 5,572,248 A | 11/1996 | Allen et al. |
| 5,587,726 A | 12/1996 | Moffat |
| 5,612,733 A | 3/1997 | Flohr |
| 5,625,410 A | 4/1997 | Washino et al. |
| 5,666,153 A | 9/1997 | Copeland |
| 5,673,401 A | 9/1997 | Volk et al. |
| 5,675,374 A | 10/1997 | Kohda |
| 5,689,663 A | 11/1997 | Williams |
| 5,708,787 A | 1/1998 | Nakano et al. |
| 5,713,033 A | 1/1998 | Sado |
| 5,715,377 A | 2/1998 | Fukushima et al. |
| D391,558 S | 3/1998 | Marshall et al. |
| D391,935 S | 3/1998 | Sakaguchi et al. |
| D392,269 S | 3/1998 | Mason et al. |
| 5,729,471 A | 3/1998 | Jain et al. |
| 5,737,011 A | 4/1998 | Lukacs |
| 5,745,116 A | 4/1998 | Pisutha-Arnond |
| 5,748,121 A | 5/1998 | Romriell |
| D395,292 S | 6/1998 | Vu |
| 5,760,826 A | 6/1998 | Nayar |
| D396,455 S | 7/1998 | Bier |
| D396,456 S | 7/1998 | Bier |
| 5,790,182 A | 8/1998 | Hilaire |
| 5,796,724 A | 8/1998 | Rajamani et al. |
| D397,687 S | 9/1998 | Arora et al. |
| D398,595 S | 9/1998 | Baer et al. |
| 5,815,196 A | 9/1998 | Alshawi |
| D399,501 S | 10/1998 | Arora et al. |
| 5,818,514 A | 10/1998 | Duttweiler et al. |
| 5,821,985 A | 10/1998 | Iizawa |
| 5,825,362 A | 10/1998 | Retter |
| D406,124 S | 2/1999 | Newton et al. |
| 5,889,499 A | 3/1999 | Nally et al. |
| 5,894,321 A | 4/1999 | Downs et al. |
| D409,243 S | 5/1999 | Lonergan |
| D410,447 S | 6/1999 | Chang |
| 5,929,857 A | 7/1999 | Dinallo et al. |
| 5,940,118 A | 8/1999 | Van Schyndel |
| 5,940,530 A | 8/1999 | Fukushima et al. |
| 5,953,052 A | 9/1999 | McNelley et al. |
| 5,956,100 A | 9/1999 | Gorski |
| 5,996,003 A | 11/1999 | Namikata et al. |
| D419,543 S | 1/2000 | Warren et al. |
| D420,995 S | 2/2000 | Imamura et al. |
| 6,069,648 A | 5/2000 | Suso et al. |
| 6,069,658 A | 5/2000 | Watanabe |
| 6,088,045 A | 7/2000 | Lumelsky et al. |
| 6,097,390 A | 8/2000 | Marks |
| 6,097,441 A | 8/2000 | Allport |
| 6,101,113 A | 8/2000 | Paice |
| 6,124,896 A | 9/2000 | Kurashige |
| 6,137,485 A | 10/2000 | Kawai et al. |
| 6,148,092 A | 11/2000 | Qian |
| D435,561 S | 12/2000 | Pettigrew et al. |
| 6,167,162 A | 12/2000 | Jacquin et al. |
| 6,172,703 B1 | 1/2001 | Lee |
| 6,173,069 B1 | 1/2001 | Daly et al. |
| D438,873 S | 3/2001 | Wang et al. |
| D440,575 S | 4/2001 | Wang et al. |
| 6,211,870 B1 | 4/2001 | Foster |
| 6,226,035 B1 | 5/2001 | Korein et al. |
| 6,243,130 B1 | 6/2001 | McNelley et al. |
| 6,249,318 B1 | 6/2001 | Girod et al. |
| 6,256,400 B1 | 7/2001 | Takata et al. |
| 6,259,469 B1 | 7/2001 | Ejima et al. |
| 6,266,082 B1 | 7/2001 | Yonezawa et al. |
| 6,266,098 B1 | 7/2001 | Cove et al. |
| D446,790 S | 8/2001 | Wang et al. |
| 6,285,392 B1 | 9/2001 | Satoda et al. |
| 6,292,188 B1 | 9/2001 | Carlson et al. |
| 6,292,575 B1 | 9/2001 | Bortolussi et al. |
| D450,323 S | 11/2001 | Moore et al. |
| D453,167 S | 1/2002 | Hasegawa et al. |
| D454,574 S | 3/2002 | Wasko et al. |
| 6,356,589 B1 | 3/2002 | Gebler et al. |
| 6,380,539 B1 | 4/2002 | Edgar |
| 6,396,514 B1 | 5/2002 | Kohno |
| 6,424,377 B1 | 7/2002 | Driscoll, Jr. |
| D461,191 S | 8/2002 | Hickey et al. |
| 6,430,222 B1 | 8/2002 | Okada |
| 6,459,451 B2 | 10/2002 | Driscoll et al. |
| 6,462,767 B1 | 10/2002 | Obata et al. |
| 6,493,032 B1 | 12/2002 | Wallerstein et al. |
| D468,322 S | 1/2003 | Walker et al. |
| 6,507,356 B1 | 1/2003 | Jackel et al. |
| D470,153 S | 2/2003 | Billmaier et al. |
| 6,515,695 B1 | 2/2003 | Sato et al. |
| D474,194 S | 5/2003 | Kates et al. |
| 6,573,904 B1 | 6/2003 | Chun et al. |
| 6,577,333 B2 | 6/2003 | Tai et al. |
| 6,583,808 B2 | 6/2003 | Boulanger et al. |
| 6,590,603 B2 | 7/2003 | Sheldon et al. |
| 6,591,314 B1 | 7/2003 | Colbath |
| 6,593,955 B1 | 7/2003 | Falcon |
| 6,593,956 B1 | 7/2003 | Potts et al. |
| D478,090 S | 8/2003 | Nguyen et al. |
| D478,912 S | 8/2003 | Johnson |
| 6,611,281 B2 | 8/2003 | Strubbe |
| D482,368 S | 11/2003 | den Toonder et al. |
| 6,680,856 B2 | 1/2004 | Schreiber |
| 6,693,663 B1 | 2/2004 | Harris |
| 6,694,094 B2 | 2/2004 | Partynski et al. |
| 6,704,048 B1 | 3/2004 | Malkin et al. |
| 6,710,797 B1 | 3/2004 | McNelley et al. |
| 6,751,106 B2 | 6/2004 | Zhang et al. |
| D492,692 S | 7/2004 | Fallon et al. |
| 6,763,226 B1 | 7/2004 | McZeal |
| 6,768,722 B1 | 7/2004 | Katseff et al. |
| D494,186 S | 8/2004 | Johnson |
| 6,771,303 B2 | 8/2004 | Zhang et al. |
| 6,774,927 B1 | 8/2004 | Cohen et al. |
| D495,715 S | 9/2004 | Gildred |
| 6,795,108 B2 | 9/2004 | Jarboe et al. |
| 6,795,558 B2 | 9/2004 | Matsuo et al. |
| 6,798,834 B1 | 9/2004 | Murakami et al. |
| 6,806,898 B1 | 10/2004 | Toyama et al. |
| 6,807,280 B1 | 10/2004 | Stroud et al. |
| 6,809,724 B1 | 10/2004 | Shiraishi et al. |
| 6,831,653 B2 | 12/2004 | Kehlet et al. |
| 6,844,990 B2 | 1/2005 | Artonne et al. |
| 6,853,398 B2 | 2/2005 | Malzbender et al. |
| 6,867,798 B1 | 3/2005 | Wada et al. |
| 6,882,358 B1 | 4/2005 | Schuster et al. |
| 6,888,358 B2 | 5/2005 | Lechner et al. |
| D506,208 S | 6/2005 | Jewitt et al. |
| 6,909,438 B1 | 6/2005 | White et al. |
| 6,911,995 B2 | 6/2005 | Ivanov et al. |
| 6,917,271 B2 | 7/2005 | Zhang et al. |
| 6,922,718 B2 | 7/2005 | Chang |
| 6,925,613 B2 | 8/2005 | Gibson |
| 6,963,653 B1 | 11/2005 | Miles |
| D512,723 S | 12/2005 | Wirz |
| 6,980,526 B2 | 12/2005 | Jang et al. |

(56) References Cited

U.S. PATENT DOCUMENTS

| | | | |
|---|---|---|---|
| 6,989,754 B2 | 1/2006 | Kisacanin et al. |
| 6,989,836 B2 | 1/2006 | Ramsey |
| 6,989,856 B2 | 1/2006 | Firestone et al. |
| 6,990,086 B1 | 1/2006 | Holur et al. |
| 7,002,973 B2 | 2/2006 | MeLampy et al. |
| 7,023,855 B2 | 4/2006 | Haumont et al. |
| 7,028,092 B2 | 4/2006 | MeLampy et al. |
| 7,030,890 B1 | 4/2006 | Jouet et al. |
| 7,031,311 B2 | 4/2006 | MeLampy et al. |
| 7,036,092 B2 | 4/2006 | Sloo et al. |
| D521,521 S | 5/2006 | Jewitt et al. |
| 7,043,528 B2 | 5/2006 | Schmitt et al. |
| 7,046,862 B2 | 5/2006 | Ishizaka et al. |
| D522,559 S | 6/2006 | Naito et al. |
| 7,057,636 B1 * | 6/2006 | Cohen-Solal et al. ...... 348/14.08 |
| 7,057,662 B2 | 6/2006 | Malzbender |
| 7,058,690 B2 | 6/2006 | Maehiro |
| 7,061,896 B2 | 6/2006 | Jabbari et al. |
| D524,321 S | 7/2006 | Hally et al. |
| 7,072,504 B2 | 7/2006 | Miyano et al. |
| 7,072,833 B2 | 7/2006 | Rajan |
| 7,080,157 B2 | 7/2006 | McCanne |
| 7,092,002 B2 | 8/2006 | Ferren et al. |
| 7,111,045 B2 | 9/2006 | Kato et al. |
| 7,126,627 B1 | 10/2006 | Lewis et al. |
| 7,131,135 B1 | 10/2006 | Virag et al. |
| 7,136,651 B2 | 11/2006 | Kalavade |
| 7,139,767 B1 | 11/2006 | Taylor et al. |
| D533,525 S | 12/2006 | Arie |
| D533,852 S | 12/2006 | Ma |
| D534,511 S | 1/2007 | Maeda et al. |
| D535,954 S | 1/2007 | Hwang et al. |
| D536,001 S | 1/2007 | Armstrong et al. |
| 7,158,674 B2 | 1/2007 | Suh |
| 7,161,942 B2 | 1/2007 | Chen et al. |
| 7,164,435 B2 | 1/2007 | Wang et al. |
| D536,340 S | 2/2007 | Jost et al. |
| D539,243 S | 3/2007 | Chiu et al. |
| 7,197,008 B1 | 3/2007 | Shabtay et al. |
| D540,336 S | 4/2007 | Kim et al. |
| D541,773 S | 5/2007 | Chong et al. |
| D542,247 S | 5/2007 | Kinoshita et al. |
| 7,221,260 B2 | 5/2007 | Berezowski et al. |
| D544,494 S | 6/2007 | Cummins |
| D545,314 S | 6/2007 | Kim |
| D547,320 S | 7/2007 | Kim et al. |
| 7,239,338 B2 | 7/2007 | Krisbergh et al. |
| 7,246,118 B2 | 7/2007 | Chastain et al. |
| D548,742 S | 8/2007 | Fletcher |
| 7,254,785 B2 | 8/2007 | Reed |
| D550,635 S | 9/2007 | DeMaio et al. |
| D551,184 S | 9/2007 | Kanou et al. |
| D551,672 S | 9/2007 | Wirz |
| 7,269,292 B2 | 9/2007 | Steinberg |
| 7,274,555 B2 | 9/2007 | Kim et al. |
| D554,664 S | 11/2007 | Van Dongen et al. |
| D555,610 S | 11/2007 | Yang et al. |
| D559,265 S | 1/2008 | Armstrong et al. |
| D560,225 S | 1/2008 | Park et al. |
| D560,681 S | 1/2008 | Fletcher |
| D561,130 S | 2/2008 | Won et al. |
| 7,336,299 B2 | 2/2008 | Kostrzewski |
| D563,965 S | 3/2008 | Van Dongen et al. |
| D564,530 S | 3/2008 | Kim et al. |
| D567,202 S | 4/2008 | Rieu Piquet |
| 7,352,809 B2 | 4/2008 | Wenger et al. |
| 7,353,279 B2 | 4/2008 | Durvasula et al. |
| 7,353,462 B2 | 4/2008 | Caffarelli |
| 7,359,731 B2 | 4/2008 | Choksi |
| 7,399,095 B2 | 7/2008 | Rondinelli |
| D574,392 S | 8/2008 | Kwag et al. |
| 7,411,975 B1 | 8/2008 | Mohaban |
| 7,413,150 B1 | 8/2008 | Hsu |
| 7,428,000 B2 | 9/2008 | Cutler et al. |
| D578,496 S | 10/2008 | Leonard |
| 7,440,615 B2 | 10/2008 | Gong et al. |
| D580,451 S | 11/2008 | Steele et al. |
| 7,450,134 B2 | 11/2008 | Maynard et al. |
| 7,471,320 B2 | 12/2008 | Malkin et al. |
| D585,453 S | 1/2009 | Chen et al. |
| 7,477,322 B2 | 1/2009 | Hsieh |
| 7,477,657 B1 | 1/2009 | Murphy et al. |
| 7,480,870 B2 | 1/2009 | Anzures et al. |
| D588,560 S | 3/2009 | Mellingen et al. |
| D589,053 S | 3/2009 | Steele et al. |
| 7,505,036 B1 | 3/2009 | Baldwin |
| D591,306 S | 4/2009 | Setiawan et al. |
| 7,518,051 B2 | 4/2009 | Redmann |
| D592,621 S | 5/2009 | Han |
| 7,529,425 B2 | 5/2009 | Kitamura et al. |
| 7,532,230 B2 | 5/2009 | Culbertson et al. |
| 7,532,232 B2 | 5/2009 | Shah et al. |
| 7,534,056 B2 | 5/2009 | Cross et al. |
| 7,545,761 B1 | 6/2009 | Kalbag |
| 7,551,432 B1 | 6/2009 | Bockheim et al. |
| 7,555,141 B2 | 6/2009 | Mori |
| D595,728 S | 7/2009 | Scheibe et al. |
| D596,646 S | 7/2009 | Wani |
| 7,575,537 B2 | 8/2009 | Ellis |
| 7,577,246 B2 | 8/2009 | Idan et al. |
| D602,033 S | 10/2009 | Vu et al. |
| D602,453 S | 10/2009 | Ding et al. |
| D602,495 S | 10/2009 | Um et al. |
| 7,610,352 B2 | 10/2009 | AlHusseini et al. |
| 7,610,599 B1 | 10/2009 | Nashida et al. |
| 7,616,226 B2 | 11/2009 | Roessler et al. |
| D608,788 S | 1/2010 | Meziere |
| 7,646,419 B2 | 1/2010 | Cernasov |
| D610,560 S | 2/2010 | Chen |
| 7,661,075 B2 | 2/2010 | Lahdesmaki |
| 7,664,750 B2 | 2/2010 | Frees et al. |
| D612,394 S | 3/2010 | La et al. |
| 7,676,763 B2 | 3/2010 | Rummel |
| 7,679,639 B2 * | 3/2010 | Harrell et al. .............. 348/14.08 |
| 7,692,680 B2 | 4/2010 | Graham |
| 7,707,247 B2 | 4/2010 | Dunn et al. |
| D615,514 S | 5/2010 | Mellingen et al. |
| 7,710,448 B2 | 5/2010 | De Beer et al. |
| 7,710,450 B2 | 5/2010 | Dhuey et al. |
| 7,714,222 B2 | 5/2010 | Taub et al. |
| 7,715,657 B2 | 5/2010 | Lin et al. |
| 7,719,605 B2 | 5/2010 | Hirasawa et al. |
| 7,719,662 B2 | 5/2010 | Bamji et al. |
| 7,720,277 B2 | 5/2010 | Hattori |
| 7,725,919 B1 | 5/2010 | Thiagarajan et al. |
| D617,806 S | 6/2010 | Christie et al. |
| D619,608 S | 7/2010 | Meziere |
| D619,609 S | 7/2010 | Meziere |
| D619,610 S | 7/2010 | Meziere |
| D619,611 S | 7/2010 | Meziere |
| 7,752,568 B2 | 7/2010 | Park et al. |
| D621,410 S | 8/2010 | Verfuerth et al. |
| D626,102 S | 10/2010 | Buzzard et al. |
| D626,103 S | 10/2010 | Buzzard et al. |
| D628,175 S | 11/2010 | Desai et al. |
| 7,839,434 B2 * | 11/2010 | Ciudad et al. ............ 348/211.12 |
| D628,968 S | 12/2010 | Desai et al. |
| 7,855,726 B2 | 12/2010 | Ferren et al. |
| 7,861,189 B2 | 12/2010 | Watanabe et al. |
| D631,891 S | 2/2011 | Vance et al. |
| D632,698 S | 2/2011 | Judy et al. |
| 7,889,851 B2 | 2/2011 | Shah et al. |
| 7,890,888 B2 | 2/2011 | Glasgow et al. |
| 7,894,531 B1 | 2/2011 | Cetin et al. |
| D634,726 S | 3/2011 | Harden et al. |
| D634,753 S | 3/2011 | Loretan et al. |
| D635,569 S | 4/2011 | Park |
| D635,975 S | 4/2011 | Seo et al. |
| D637,199 S | 5/2011 | Brinda |
| D638,025 S | 5/2011 | Saft et al. |
| D638,850 S | 5/2011 | Woods et al. |
| D638,853 S | 5/2011 | Brinda |
| 7,939,959 B2 | 5/2011 | Wagoner |
| D640,268 S | 6/2011 | Jones et al. |

(56) References Cited

U.S. PATENT DOCUMENTS

| | | |
|---|---|---|
| D642,184 S | 7/2011 | Brouwers et al. |
| 7,990,422 B2 | 8/2011 | Ahiska et al. |
| 7,996,775 B2 | 8/2011 | Cole et al. |
| 8,000,559 B2 | 8/2011 | Kwon |
| D646,690 S | 10/2011 | Thai et al. |
| D648,734 S | 11/2011 | Christie et al. |
| D649,556 S | 11/2011 | Judy et al. |
| 8,077,857 B1 | 12/2011 | Lambert |
| 8,081,346 B1 | 12/2011 | Anup et al. |
| 8,086,076 B2 | 12/2011 | Tian et al. |
| D652,050 S | 1/2012 | Chaudhri |
| D652,429 S | 1/2012 | Steele et al. |
| D654,926 S | 2/2012 | Lipman et al. |
| D656,513 S | 3/2012 | Thai et al. |
| 8,132,100 B2 | 3/2012 | Seo et al. |
| 8,135,068 B1 | 3/2012 | Alvarez |
| D656,948 S | 4/2012 | Knudsen et al. |
| D660,313 S | 5/2012 | Williams et al. |
| 8,179,419 B2 | 5/2012 | Girish et al. |
| 8,203,590 B2 * | 6/2012 | Thielman et al. ......... 348/14.05 |
| 8,209,632 B2 | 6/2012 | Reid et al. |
| 8,219,404 B2 | 7/2012 | Weinberg et al. |
| 8,219,920 B2 | 7/2012 | Langoulant et al. |
| D664,985 S | 8/2012 | Tanghe et al. |
| 8,259,155 B2 * | 9/2012 | Marathe et al. ............ 348/14.08 |
| D669,086 S | 10/2012 | Boyer et al. |
| D669,088 S | 10/2012 | Boyer et al. |
| D669,913 S | 10/2012 | Maggiotto et al. |
| 8,289,363 B2 * | 10/2012 | Buckler ..................... 348/14.08 |
| 8,299,979 B2 | 10/2012 | Rambo et al. |
| D670,723 S | 11/2012 | Khan et al. |
| D671,136 S | 11/2012 | Barnett et al. |
| D671,141 S | 11/2012 | Peters et al. |
| 8,315,466 B2 | 11/2012 | El-Maleh et al. |
| 8,339,499 B2 | 12/2012 | Ohuchi |
| 8,363,719 B2 | 1/2013 | Nakayama |
| 8,436,888 B1 | 5/2013 | Baldino et al. |
| 2002/0047892 A1 | 4/2002 | Gonsalves |
| 2002/0106120 A1 | 8/2002 | Brandenburg et al. |
| 2002/0108125 A1 | 8/2002 | Joao |
| 2002/0113827 A1 | 8/2002 | Perlman et al. |
| 2002/0114392 A1 | 8/2002 | Sekiguchi et al. |
| 2002/0118890 A1 | 8/2002 | Rondinelli |
| 2002/0131608 A1 | 9/2002 | Lobb et al. |
| 2002/0140804 A1 | 10/2002 | Colmenarez et al. |
| 2002/0149672 A1 | 10/2002 | Clapp et al. |
| 2002/0163538 A1 | 11/2002 | Shteyn |
| 2002/0186528 A1 | 12/2002 | Huang |
| 2002/0196737 A1 | 12/2002 | Bullard |
| 2003/0017872 A1 | 1/2003 | Oishi et al. |
| 2003/0048218 A1 | 3/2003 | Milnes et al. |
| 2003/0071932 A1 | 4/2003 | Tanigaki |
| 2003/0072460 A1 | 4/2003 | Gonopolskiy et al. |
| 2003/0149724 A1 | 8/2003 | Chang |
| 2003/0160861 A1 | 8/2003 | Barlow et al. |
| 2003/0179285 A1 | 9/2003 | Naito |
| 2003/0185303 A1 | 10/2003 | Hall |
| 2003/0197687 A1 | 10/2003 | Shetter |
| 2004/0003411 A1 | 1/2004 | Nakai et al. |
| 2004/0032906 A1 | 2/2004 | Lillig |
| 2004/0038169 A1 | 2/2004 | Mandelkern et al. |
| 2004/0039778 A1 | 2/2004 | Read et al. |
| 2004/0061787 A1 | 4/2004 | Liu et al. |
| 2004/0091232 A1 | 5/2004 | Appling, III |
| 2004/0118984 A1 | 6/2004 | Kim et al. |
| 2004/0119814 A1 | 6/2004 | Clisham et al. |
| 2004/0164858 A1 | 8/2004 | Lin |
| 2004/0165060 A1 | 8/2004 | McNelley et al. |
| 2004/0178955 A1 | 9/2004 | Menache et al. |
| 2004/0189463 A1 | 9/2004 | Wathen |
| 2004/0189676 A1 | 9/2004 | Dischert |
| 2004/0196250 A1 | 10/2004 | Mehrotra et al. |
| 2004/0207718 A1 | 10/2004 | Boyden et al. |
| 2004/0218755 A1 | 11/2004 | Marton et al. |
| 2004/0221243 A1 | 11/2004 | Twerdahl et al. |
| 2004/0246962 A1 | 12/2004 | Kopeikin et al. |
| 2004/0246972 A1 | 12/2004 | Wang et al. |
| 2004/0254982 A1 | 12/2004 | Hoffman et al. |
| 2004/0260796 A1 | 12/2004 | Sundqvist et al. |
| 2005/0007954 A1 | 1/2005 | Sreemanthula et al. |
| 2005/0022130 A1 | 1/2005 | Fabritius |
| 2005/0024484 A1 | 2/2005 | Leonard |
| 2005/0034084 A1 | 2/2005 | Ohtsuki et al. |
| 2005/0039142 A1 | 2/2005 | Jalon et al. |
| 2005/0050246 A1 | 3/2005 | Lakkakorpi et al. |
| 2005/0081160 A1 | 4/2005 | Wee et al. |
| 2005/0099492 A1 | 5/2005 | Orr |
| 2005/0110867 A1 | 5/2005 | Schulz |
| 2005/0117022 A1 | 6/2005 | Marchant |
| 2005/0129325 A1 | 6/2005 | Wu |
| 2005/0147257 A1 | 7/2005 | Melchior et al. |
| 2005/0149872 A1 | 7/2005 | Fong et al. |
| 2005/0154988 A1 | 7/2005 | Proehl et al. |
| 2005/0223069 A1 | 10/2005 | Cooperman et al. |
| 2005/0235209 A1 | 10/2005 | Morita et al. |
| 2005/0248652 A1 | 11/2005 | Firestone et al. |
| 2005/0251760 A1 | 11/2005 | Sato et al. |
| 2005/0268823 A1 | 12/2005 | Bakker et al. |
| 2006/0013495 A1 | 1/2006 | Duan et al. |
| 2006/0017807 A1 | 1/2006 | Lee et al. |
| 2006/0028983 A1 | 2/2006 | Wright |
| 2006/0029084 A1 | 2/2006 | Grayson |
| 2006/0038878 A1 | 2/2006 | Takashima et al. |
| 2006/0048070 A1 | 3/2006 | Taylor et al. |
| 2006/0056056 A1 | 3/2006 | Ahiska et al. |
| 2006/0066717 A1 | 3/2006 | Miceli |
| 2006/0072813 A1 | 4/2006 | Matsumoto et al. |
| 2006/0082643 A1 | 4/2006 | Richards |
| 2006/0093128 A1 | 5/2006 | Oxford |
| 2006/0100004 A1 | 5/2006 | Kim et al. |
| 2006/0104297 A1 | 5/2006 | Buyukkoc et al. |
| 2006/0104470 A1 | 5/2006 | Akino |
| 2006/0120307 A1 | 6/2006 | Sahashi |
| 2006/0120568 A1 | 6/2006 | McConville et al. |
| 2006/0125691 A1 | 6/2006 | Menache et al. |
| 2006/0126878 A1 | 6/2006 | Takumai et al. |
| 2006/0152489 A1 | 7/2006 | Sweetser et al. |
| 2006/0152575 A1 | 7/2006 | Amiel et al. |
| 2006/0158509 A1 | 7/2006 | Kenoyer et al. |
| 2006/0168302 A1 | 7/2006 | Boskovic et al. |
| 2006/0170769 A1 | 8/2006 | Zhou |
| 2006/0181607 A1 | 8/2006 | McNelley et al. |
| 2006/0200518 A1 | 9/2006 | Sinclair et al. |
| 2006/0233120 A1 | 10/2006 | Eshel et al. |
| 2006/0256187 A1 | 11/2006 | Sheldon et al. |
| 2006/0284786 A1 | 12/2006 | Takano et al. |
| 2006/0289772 A1 | 12/2006 | Johnson et al. |
| 2007/0019621 A1 | 1/2007 | Perry et al. |
| 2007/0022388 A1 | 1/2007 | Jennings |
| 2007/0039030 A1 | 2/2007 | Romanowich et al. |
| 2007/0040903 A1 | 2/2007 | Kawaguchi |
| 2007/0070177 A1 | 3/2007 | Christensen |
| 2007/0074123 A1 | 3/2007 | Omura et al. |
| 2007/0080845 A1 | 4/2007 | Amand |
| 2007/0112966 A1 | 5/2007 | Eftis et al. |
| 2007/0120971 A1 | 5/2007 | Kennedy |
| 2007/0121353 A1 | 5/2007 | Zhang et al. |
| 2007/0140337 A1 | 6/2007 | Lim et al. |
| 2007/0153712 A1 | 7/2007 | Fry et al. |
| 2007/0157119 A1 | 7/2007 | Bishop |
| 2007/0159523 A1 | 7/2007 | Hillis et al. |
| 2007/0162866 A1 | 7/2007 | Matthews et al. |
| 2007/0183661 A1 | 8/2007 | El-Maleh et al. |
| 2007/0188597 A1 * | 8/2007 | Kenoyer .................... 348/14.08 |
| 2007/0189219 A1 | 8/2007 | Navali et al. |
| 2007/0192381 A1 | 8/2007 | Padmanabhan |
| 2007/0206091 A1 | 9/2007 | Dunn et al. |
| 2007/0206556 A1 | 9/2007 | Yegani et al. |
| 2007/0206602 A1 | 9/2007 | Halabi et al. |
| 2007/0217406 A1 | 9/2007 | Riedel et al. |
| 2007/0217500 A1 | 9/2007 | Gao et al. |
| 2007/0229250 A1 | 10/2007 | Recker et al. |
| 2007/0240073 A1 | 10/2007 | McCarthy et al. |
| 2007/0247470 A1 | 10/2007 | Dhuey et al. |

(56) References Cited

U.S. PATENT DOCUMENTS

| | | |
|---|---|---|
| 2007/0250567 A1 | 10/2007 | Graham et al. |
| 2007/0250620 A1 | 10/2007 | Shah et al. |
| 2007/0263079 A1 | 11/2007 | Graham et al. |
| 2007/0273752 A1 | 11/2007 | Chambers et al. |
| 2007/0279483 A1* | 12/2007 | Beers et al. ............ 348/14.08 |
| 2007/0279484 A1 | 12/2007 | Derocher et al. |
| 2007/0285505 A1 | 12/2007 | Korneliussen |
| 2008/0043041 A2 | 2/2008 | Hedenstroem et al. |
| 2008/0044064 A1 | 2/2008 | His |
| 2008/0046840 A1 | 2/2008 | Melton et al. |
| 2008/0077390 A1 | 3/2008 | Nagao |
| 2008/0077883 A1 | 3/2008 | Kim et al. |
| 2008/0084429 A1 | 4/2008 | Wissinger |
| 2008/0119211 A1 | 5/2008 | Paas et al. |
| 2008/0134098 A1 | 6/2008 | Hoglund et al. |
| 2008/0136896 A1 | 6/2008 | Graham et al. |
| 2008/0148187 A1 | 6/2008 | Miyata et al. |
| 2008/0151038 A1 | 6/2008 | Khouri et al. |
| 2008/0153537 A1 | 6/2008 | Khawand et al. |
| 2008/0167078 A1 | 7/2008 | Elbye |
| 2008/0198755 A1 | 8/2008 | Vasseur et al. |
| 2008/0208444 A1 | 8/2008 | Ruckart |
| 2008/0212677 A1 | 9/2008 | Chen et al. |
| 2008/0215974 A1 | 9/2008 | Harrison et al. |
| 2008/0215993 A1 | 9/2008 | Rossman |
| 2008/0218582 A1 | 9/2008 | Buckler |
| 2008/0219268 A1 | 9/2008 | Dennison |
| 2008/0232688 A1 | 9/2008 | Senior et al. |
| 2008/0232692 A1 | 9/2008 | Kaku |
| 2008/0240237 A1 | 10/2008 | Tian et al. |
| 2008/0240571 A1 | 10/2008 | Tian et al. |
| 2008/0246833 A1 | 10/2008 | Yasui et al. |
| 2008/0256474 A1 | 10/2008 | Chakra et al. |
| 2008/0261569 A1 | 10/2008 | Britt et al. |
| 2008/0266380 A1* | 10/2008 | Gorzynski et al. ......... 348/14.08 |
| 2008/0267282 A1 | 10/2008 | Kalipatnapu et al. |
| 2008/0276184 A1 | 11/2008 | Buffet et al. |
| 2008/0297586 A1 | 12/2008 | Kurtz et al. |
| 2008/0297587 A1* | 12/2008 | Kurtz et al. ............ 348/14.08 |
| 2008/0298571 A1 | 12/2008 | Kurtz et al. |
| 2008/0303901 A1 | 12/2008 | Variyath et al. |
| 2009/0009593 A1 | 1/2009 | Cameron et al. |
| 2009/0012633 A1 | 1/2009 | Liu et al. |
| 2009/0037827 A1 | 2/2009 | Bennetts |
| 2009/0051756 A1 | 2/2009 | Trachtenberg |
| 2009/0079812 A1* | 3/2009 | Crenshaw et al. ......... 348/14.01 |
| 2009/0115723 A1 | 5/2009 | Henty |
| 2009/0119603 A1 | 5/2009 | Stackpole |
| 2009/0122867 A1 | 5/2009 | Mauchly et al. |
| 2009/0129753 A1 | 5/2009 | Wagenlander |
| 2009/0172596 A1 | 7/2009 | Yamashita |
| 2009/0174764 A1 | 7/2009 | Chadha et al. |
| 2009/0183122 A1 | 7/2009 | Webb et al. |
| 2009/0193345 A1 | 7/2009 | Wensley et al. |
| 2009/0204538 A1 | 8/2009 | Ley et al. |
| 2009/0207179 A1 | 8/2009 | Huang et al. |
| 2009/0207234 A1 | 8/2009 | Chen et al. |
| 2009/0217199 A1 | 8/2009 | Hara et al. |
| 2009/0228807 A1 | 9/2009 | Lemay |
| 2009/0244257 A1 | 10/2009 | MacDonald et al. |
| 2009/0256901 A1 | 10/2009 | Mauchly et al. |
| 2009/0260060 A1 | 10/2009 | Smith et al. |
| 2009/0265628 A1 | 10/2009 | Bamford et al. |
| 2009/0279476 A1 | 11/2009 | Li et al. |
| 2009/0322082 A1 | 12/2009 | Wagoner |
| 2009/0324023 A1 | 12/2009 | Tian et al. |
| 2010/0005419 A1 | 1/2010 | Miichi et al. |
| 2010/0008373 A1 | 1/2010 | Xiao et al. |
| 2010/0014530 A1 | 1/2010 | Cutaia |
| 2010/0027907 A1 | 2/2010 | Cherna et al. |
| 2010/0030389 A1 | 2/2010 | Palmer et al. |
| 2010/0042281 A1 | 2/2010 | Filla |
| 2010/0049542 A1 | 2/2010 | Benjamin et al. |
| 2010/0118112 A1 | 5/2010 | Nimri et al. |
| 2010/0123770 A1 | 5/2010 | Friel et al. |
| 2010/0149301 A1 | 6/2010 | Lee et al. |
| 2010/0153853 A1 | 6/2010 | Dawes et al. |
| 2010/0171807 A1 | 7/2010 | Tysso |
| 2010/0171808 A1 | 7/2010 | Harrell et al. |
| 2010/0183199 A1 | 7/2010 | Smith et al. |
| 2010/0199228 A1 | 8/2010 | Latta et al. |
| 2010/0201823 A1 | 8/2010 | Zhang et al. |
| 2010/0202285 A1 | 8/2010 | Cohen et al. |
| 2010/0205281 A1 | 8/2010 | Porter et al. |
| 2010/0205543 A1 | 8/2010 | Von Werther et al. |
| 2010/0208078 A1 | 8/2010 | Tian et al. |
| 2010/0225732 A1 | 9/2010 | De Beer et al. |
| 2010/0241845 A1 | 9/2010 | Alonso |
| 2010/0259619 A1 | 10/2010 | Nicholson |
| 2010/0262367 A1 | 10/2010 | Riggins et al. |
| 2010/0268843 A1 | 10/2010 | Van Wie et al. |
| 2010/0277563 A1 | 11/2010 | Gupta et al. |
| 2010/0306703 A1 | 12/2010 | Bourganel et al. |
| 2010/0313148 A1 | 12/2010 | Hochendoner et al. |
| 2010/0316232 A1 | 12/2010 | Acero et al. |
| 2010/0325547 A1 | 12/2010 | Keng et al. |
| 2011/0008017 A1 | 1/2011 | Gausereide |
| 2011/0029868 A1 | 2/2011 | Moran et al. |
| 2011/0039506 A1 | 2/2011 | Lindahl et al. |
| 2011/0063467 A1 | 3/2011 | Tanaka |
| 2011/0082808 A1 | 4/2011 | Beykpour et al. |
| 2011/0085016 A1 | 4/2011 | Kristiansen et al. |
| 2011/0090303 A1 | 4/2011 | Wu et al. |
| 2011/0105220 A1 | 5/2011 | Hill et al. |
| 2011/0109642 A1 | 5/2011 | Chang et al. |
| 2011/0113348 A1 | 5/2011 | Twiss et al. |
| 2011/0164106 A1 | 7/2011 | Kim |
| 2011/0202878 A1 | 8/2011 | Park et al. |
| 2011/0225534 A1 | 9/2011 | Wala |
| 2011/0242266 A1 | 10/2011 | Blackburn et al. |
| 2011/0249081 A1 | 10/2011 | Kay et al. |
| 2011/0249086 A1 | 10/2011 | Guo et al. |
| 2011/0276901 A1 | 11/2011 | Zambetti et al. |
| 2011/0279627 A1 | 11/2011 | Shyu |
| 2011/0319885 A1 | 12/2011 | Skwarek et al. |
| 2012/0026278 A1 | 2/2012 | Goodman et al. |
| 2012/0038742 A1 | 2/2012 | Robinson et al. |
| 2012/0106428 A1 | 5/2012 | Schlicht et al. |
| 2012/0143605 A1 | 6/2012 | Thorsen et al. |
| 2012/0169838 A1 | 7/2012 | Sekine |
| 2012/0226997 A1 | 9/2012 | Pang |
| 2012/0266082 A1 | 10/2012 | Webber |
| 2012/0297342 A1 | 11/2012 | Jang et al. |
| 2012/0327173 A1 | 12/2012 | Couse et al. |

FOREIGN PATENT DOCUMENTS

| | | |
|---|---|---|
| EP | 502600 A2 | 9/1992 |
| EP | 0 650 299 | 10/1994 |
| EP | 0 714 081 | 11/1995 |
| EP | 0 740 177 | 4/1996 |
| EP | 1 143745 A2 | 10/2001 |
| EP | 1 178 352 A1 | 6/2002 |
| EP | 1 589 758 A1 | 10/2005 |
| EP | 1701308 A2 | 9/2006 |
| EP | 1768058 A2 | 3/2007 |
| EP | 2073543 A1 | 6/2009 |
| EP | 2255531 | 12/2010 |
| EP | 2277308 | 1/2011 |
| GB | 2 294 605 A | 5/1996 |
| GB | 2336266 | 10/1999 |
| GB | 2355876 A | 5/2001 |
| WO | WO 94/16517 | 7/1994 |
| WO | WO 96/21321 | 7/1996 |
| WO | WO 97/08896 | 3/1997 |
| WO | WO 98/47291 | 10/1998 |
| WO | WO 99/59026 | 11/1999 |
| WO | WO 01/33840 | 5/2001 |
| WO | WO 2005/013001 A2 | 2/2005 |
| WO | WO 2005/031001 A3 | 2/2005 |
| WO | WO 2006/072755 | 7/2006 |
| WO | WO2007/106457 | 9/2007 |
| WO | WO2007/123946 | 11/2007 |
| WO | WO 2007/123960 A2 | 11/2007 |

(56) References Cited

FOREIGN PATENT DOCUMENTS

| WO | WO 2007/123960 A3 | 11/2007 |
| WO | WO2008/039371 | 4/2008 |
| WO | WO 2008/040258 | 4/2008 |
| WO | WO 2008/101117 A1 | 8/2008 |
| WO | WO 2008/118887 A2 | 10/2008 |
| WO | WO 2008/118887 A3 | 10/2008 |
| WO | WO 2009/102503 A2 | 8/2009 |
| WO | WO 2009/102503 A3 | 8/2009 |
| WO | WO 2009/120814 A2 | 10/2009 |
| WO | WO 2009/120814 A3 | 10/2009 |
| WO | WO 2010/059481 | 5/2010 |
| WO | WO2010/096342 | 8/2010 |
| WO | WO 2010/104765 | 9/2010 |
| WO | WO 2010/132271 | 11/2010 |
| WO | WO2012/033716 | 3/2012 |

OTHER PUBLICATIONS

Beesley, S.T.C., et al., "Active Macroblock Skipping in the H.264 Video Coding Standard," in Proceedings of 2005 Conference on Visualization, Imaging, and Image Processing—VIIP 2005, Sep. 7-9, 2005, Benidorm, Spain, Paper 480-261, ACTA Press, ISBN: 0-88986-528-0; 5 pages.

Chan et al., "Experiments on Block-Matching Techniques for Video Coding," Multimedia Systems, vol. 2, 1994, pp. 228-241.

Chen et al., "Toward a Compelling Sensation of Telepresence: Demonstrating a Portal to a Distant (Static) Office," Proceedings Visualization 2000; VIS 2000; Salt Lake City, UT, Oct. 8-13, 2000; Annual IEEE Conference on Visualization, Los Alamitos, CA; IEEE Comp. Soc., US, Jan. 1, 2000, pp. 327-333; http://citeseerx.ist.psu.edu/viewdoc/summary?doi=10.1.1.35.1287.

"Cisco Expo Germany 2009 Opening," Posted on YouTube on May 4, 2009; http://www.youtube.com/watch?v=SDKsaSlz4MK; 2 pages.

eJamming Audio, Learn More; [retrieved and printed on May 27, 2010] http://www.ejamming.com/learnmore/; 4 pages.

Foote, J., et al., "Flycam: Practical Panoramic Video and Automatic Camera Control," in Proceedings of IEEE International Conference on Multimedia and Expo, vol. III, Jul. 30, 2000; pp. 1419-1422; http://cileseerx.ist.psu.edu/viewdoc/versions?doi=10.1.1.138.8686.

"France Telecom's Magic Telepresence Wall," Jul. 11, 2006; http://www.humanproductivitylab.com/archive_blogs/2006/07/11/france_telecoms_magic_telepres_1.php; 4 pages.

Guili, D., et al., "Orchestral: A Distributed Platform for Virtual Musical Groups and Music Distance Learning over the Internet in JavaTM Technology" ; [retrieved and printed on Jun. 6, 2010] http://ieeexplore.ieee.org/stamp/stamp.jsp?tp=&arnumber=778626; 2 pages.

He, L., et al., "The Virtual Cinematographer: A Paradigm for Automatic Real-Time Camera Control and Directing," Proc. SIGGRAPH, © 1996; http://research.microsoft.com/en-us/um/people/lhe/papers/siggraph96.vc.pdf; 8 pages.

Jiang, Minqiang, et al., "On Lagrange Multiplier and Quantizer Adjustment for H.264 Frame-layer Video Rate Control," IEEE Transactions on Circuits and Systems for Video Technology, vol. 16, Issue 5, May 2006, pp. 663-669.

Kannangara, C.S., et al., "Complexity Reduction of H.264 Using Lagrange Multiplier Methods," IEEE Int. Conf. on Visual Information Engineering, Apr. 2005; www.rgu.ac.uk/files/h264_complexity_kannangara.pdf; 6 pages.

Kannangara, C.S., et al., "Low Complexity Skip Prediction for H.264 through Lagrangian Cost Estimation," IEEE Transactions on Circuits and Systems for Video Technology, vol. 16, No. 2, Feb. 2006; www.rgu.ac.uk/files/h264_skippredict_richardson_final.pdf; 20 pages.

Kim, Y.H., et al., "Adaptive mode decision for H.264 encoder," Electronics letters, vol. 40, Issue 19, pp. 1172-1173, Sep. 2004; 2 pages.

Lee, J. and Jeon, B., "Fast Mode Decision for H.264," ISO/IEC MPEG and ITU-T VCEG Joint Video Team, Doc. JVT-J033, Dec. 2003; http://media.skku.ac.kr/publications/paper/IntC/ljy_ICME2004.pdf; 4 pages.

Liu, Z., "Head-Size Equalization for Better Visual Perception of Video Conferencing," Proceedings, IEEEInternational Conference on Multimedia & Expo (ICME2005), Jul. 6-8, 2005, Amsterdam, The Netherlands; http://research.microsoft.com/users/cohen/HeadSizeEqualizationICME2005.pdf; 4 pages.

Mann, S., et al., "Virtual Bellows: Constructing High Quality Still from Video," Proceedings, First IEEE International Conference on Image Processing ICIP-94, Nov. 13-16, 1994, Austin, TX; http://citeseerx.ist.psu.edu/viewdoc/summary?doi=10.1.1.50.8405; 5 pages.

"Opera Over Cisco TelePresence at Cisco Expo 2009, in Hannover Germany—Apr. 28, 29," posted on YouTube on May 5, 2009; http://www.youtube.com/watch?v=xN5jNH5E-38; 1 page.

Payatagool, Chris, "Orchestral Manoeuvres in the Light of Telepresence," Telepresence Options, Nov. 12, 2008; http://www.telepresenceoptions.com/2008/11/orchestral_manoeuvres; 2pages.

PCT "International Search Report and the Written Opinion of the International Searching Authority, or the Declaration," PCT/US2010/026456, dated Jun. 29, 2010, 11 pages.

PCT International Search Report for PCT Application No. PCT/US2009/064061 dated Feb. 11, 2010, 4 pages.

PCT Written Opnion for PCT Application No. PCT/US2009/064061 dated Feb. 23, 2010; 14 pages.

Pixel Tools "Rate Control and H.264: H.264 rate control algorithm dynamically adjusts encoder parameters," [retrieved and printed on Jun. 10, 2010] http://www.pixeltools.om/rate_control_paper.html; 7 pages.

Richardson, I.E.G., et al., "Fast H.264 Skip Mode Seletion Using and Estimation Framework," Picture Coding Symposium, (Beijing, China), Apr. 2006; www.rgu.ac.uk/files/richardson_fast_skip_estmation_pcs06.pdf; 6 pages.

Satoh, Kiyohide et al., "Passive Depth Acquisition for 3D Image Displays", IEICE Transactions on Information and Systems, Information Systems Society, Tokyo, JP, Sep. 1, 1994, vol. E77-D, No. 9, pp. 949-957.

Schroeder, Erica, "The Next Top Model—Collaboration," Collaboration, The Workspace: A New World of Communications and Collaboration, Mar. 9, 2009; http//blogs.cisco.com/collaboration/comments/the_next_top_model; 3 pages.

Shum, H.-Y, et al., "A Review of Image-Based Rendering Techniques," in SPIE Proceedings vol. 4067(3); Proceedings of the Conference on Visual Communications and Image Processing 2000, Jun. 20-23, 2000, Perth, Australia; pp. 2-13; https://research.microsoft.com/pubs/68826/review_image_rendering.pdf.

Sonoma Wireworks Forums, "Jammin on Rifflink," [retrieved and printed on May 27, 2010] http://www.sonomawireworks.com/forums/viewtopic.php?id=2659; 5 pages.

Sonoma Wireworks Rifflink, [retrieved and printed on Jun. 2, 2010] http://www.sonomawireworks.com/rifflink.php; 3 pages.

Sullivan, Gary J., et al., "Video Compression—From Concepts to the H.264/AVC Standard," Proceedings IEEE, vol. 93, No. 1, Jan. 2005; http://ip.hhi.de/imagecom_G1/asseis/pdis/pieee_sullivan_wiegand_2005.pdf; 14 pages.

Sun, X., et al., "Region of Interest Extraction and Virtual Camera Control Based on Panoramic Video Capturing," IEEE Trans. Multimedia, Oct. 27, 2003; http://vision.ece.ucsb.edu/publications/04mmXdsun.pdf; 14 pages.

Westerink, P.H., et al., "Two-pass MPEG-2 variable-bitrate encoding," IBM Journal of Research and Development, Jul. 1991, vol. 43, No. 4; http://citeseerx.ist.psu.edu/viewdoc/summary?doi=10.1.1.128.421; 18 pages.

Wiegand, T., et al., "Efficient mode selection for block-based motion compensated video coding," Proceedings, 2005 International Conference on Image Processing IIP 2005, pp. 2559-2562: citeseer.ist.psu.edu/wiegand95efficient.html.

Wiegand, T., et al., "Rate-distortion optimized mode selection for very low bit rate video coding and the emerging H.263 standard," IEEE Trans. Circuits Syst. Video Technol., Apr. 1996, vol. 6, No. 2, pp. 182-190.

Xin, Jun, et al., "Efficient macrobook coding-mode decision for H.264/AVC video coding," Technical Repot MERL 2004-079, Mitsubishi Electric Research Laboratories, Jan. 2004; www.merl.com/publications/TR2004-079/; 12 pages.

(56) References Cited

OTHER PUBLICATIONS

Yang, Xiaokang, et al., Rate Control for H.264 with Two-Step Quantization Parameter Determination but Single-Pass Encoding, EURASIP Journal on Applied Signal Processing, Jun. 2006; http://downloads.hindawi.com/journals/asp/2006/063409.pdf; 13 pages.

U.S. Appl. No. 12/781,722, filed May 17, 2010, entitled "System and Method for Providing Retracting Optics in a Video Conferencing Environment," Inventor(s): Joseph T. Friel, et al.

U.S. Appl. No. 12/877,833, filed Sep. 8, 2010, entitled "System and Method for Skip Coding During Video Conferencing in a Network Environment," Inventor[s]: Dihong Tian, et al.

U.S. Appl. No. 12/870,687, filed Aug. 27, 2010, entitled "System and Method for Producing a Performance Via Video Conferencing in a Network Environment," Inventor(s): Michael A. Arnao et al.

U.S. Appl. No. 12/912,556, filed Oct. 26, 2010, entitled "System and Method for Provisioning Flows in a Mobile Network Environment," Inventors: Balaji Vankat Vankataswami, et al.

U.S. Appl. No. 12/949,614, filed Nov. 18, 2010, entitled "System and Method for Managing Optics in a Video Environment," Inventors: Torence Lu, et al.

U.S. Appl. No. 12/873,100, filed Aug. 31, 2010, entitled "System and Method for Providing Depth Adaptive Video Conferencing," Inventor(s): J. William Mauchly et al.

U.S. Appl. No. 12/946,679, filed Nov. 15, 2010, entitled "System and Method for Providing Camera Functions in a Video Environment," Inventors: Peter A.J. Fornell, et al.

U.S. Appl. No. 12/946,695, filed Nov. 15, 2010, entitled "System and Method for Providing Enhanced Audio in a Video Environment," Inventors: Wei Li, et al.

U.S. Appl. No. 12/907,914, filed Oct. 19, 2010, entitled "System and Method for Providing Videomail in a Network Environment," Inventors: David J. Mackie et al.

U.S. Appl. No. 12/950,786, filed Nov. 19, 2010, entitled "System and Method for Providing Enhanced Video Processing in a Network Environment," Inventor[s]: David J. Mackie.

U.S. Appl. No. 12/907,919, filed Oct. 19, 2010, entitled "System and Method for Providing Connectivity in a Network Environment," Inventors: David J. Mackie et al.

U.S. Appl. No. 12/946,704, filed Nov. 15, 2010, entitled "System and Method for Providing Enhanced Graphics in a Video Environment," Inventors: John M. Kanalakis, Jr., et al.

U.S. Appl. No. 12/957,116, filed Nov. 30, 2010, entitled "System and Method for Gesture Interface Control," Inventors: Shuan K. Kirby, et al.

U.S. Appl. No. 12/907,925, filed Oct. 19, 2010, entitled "System and Method for Providing a Pairing Mechanism in a Video Environment," Inventors: Gangfeng Kong et al.

U.S. Appl. No. 12/939,037, filed Nov. 3, 2010, entitled "System and Method for Managing Flows in a Mobile Network Environment," Inventors: Balaji Venkat Venkataswami et al.

U.S. Appl. No. 12/946,709, filed Nov. 15, 2010, entitled "System and Method for Providing Enhanced Graphics in a Video Environment," John M. Kanalakis, Jr., et al.

Design U.S. Appl. No. 29/375,624, filed Sep. 24, 2010, entitled "Mounted Video Unit," Inventor(s): Ashok T. Desai et al.

Design U.S. Appl. No. 29/375,627, filed Sep. 24, 2010, entitled "Mounted Video Unit," Inventor(s): Ashok T. Desai et al.

Design U.S. Appl. No. 29/369,951, filed Sep. 15, 2010, entitled "Video Unit With Integrated Features," Inventor(s): Kyle A. Buzzard et al.

Design U.S. Appl. No. 29/375,458, filed Sep. 22, 2010, entitled "Video Unit With Integrated Features," Inventor(s): Kyle A. Buzzard et al.

Design U.S. Appl. No. 29/375,619, filed Sep. 24, 2010, entitled "Free-Standing Video Unit," Inventor(s) Ashok T. Desai et al.

Design U.S. Appl. No. 29/381,245, filed Dec. 16, 2010, entitled "Interface Element," Inventor(s): John M. Kanalakis, Jr., et al.

Design U.S. Appl. No. 29/381,250, filed Dec. 16, 2010, entitled "Interface Element," Inventor(s): John M. Kanalakis, Jr., et al.

Design U.S. Appl. No. 29/381,254, filed Dec. 16, 2010, entitled "Interface Element," Inventor(s): John M. Kanalakis, Jr., et al.

Design U.S. Appl. No. 29/381,256, filed Dec. 16, 2010, entitled "Interface Element," inventor(s): John M. Kanalakis, Jr., et al.

Design U.S. Appl. No. 29/381,259, filed Dec. 16, 2010, entitled "Interface Element," Inventor(s): John M. Kanalakis, Jr., et al.

Design U.S. Appl. No. 29/381,260, filed Dec. 16, 2010, entitled "Interface Element," Inventor(s): John M. Kanalakis, Jr., et al.

Design U.S. Appl. No. 29/381,262, filed Dec. 16, 2010, entitled "Interface Element," Inventor(s): John M. Kanalakis, Jr., et al.

Design U.S. Appl. No. 29/381,264, filed Dec. 16, 2010, entitled "Interface Element," Inventor(s): John M. Kanalakis, Jr., et al.

3G, "World's First 3G Video Conference Service with New TV Commercial," Apr. 28, 2005, 4 pages; http://www.3g.co.uk/PR/April2005/1383.htm.

"Andersson, L., et al.,""LDP Specification," Network Working Group, RFC 3036, Jan. 2001, 133 pages; http://tools.ietf.org/html/rfc3036.

Awduche, D., et al., "Requirements for Traffic Engineering over MPLS," Network Working Group, RFC 2702, Sep. 1999, 30 pages; http://tools.ietf.org/pdf/rfc2702.pdf.

Berzin, O., et al., "Mobility Support Using MPLS and MP-BGP Signaling," Network Working Group, Apr. 28, 2008, 60 pages; http://www.potaroo.net/ietf/all-ids/draft-berzin-malis-mpls-mobility-01.txt.

Chen, Qing, et al., "Real-time Vision-based Hand Gesture Recognition Using Haar-like Features," Instrumentation and Measurement Technology Conference, Warsaw, Poland, May 1-3, 2007, 6 pages; http://www.google.com/url?sa=t&source=web&cd=1
&ved=0CB4QFjAA&url=http%3A%2F%2Fciteseerx.ist.psu.
edu%2Fviewdoc%2Fdownload%3Fdoi%3D10.1.1.93.
103%26rep%3Drep1%26type%3Dpdf
&ei=A28RTLKRDeftnQeXzZGRAw
&usg=AFQjCNHpwj5MwjgGp-3goVzSWad6CO-Jzw.

"Custom 3D Depth Sensing Prototype System for Gesture Control," 3D Depth Sensing, GestureTek, 3 pages; [Retrieved and printed on Dec. 1, 2010] http://www.gesturetek.com/3ddepth/introduction.php.

Digital Video Enterprises, "DVE Eye Contact Silhouette," 1 page, © DVE 2008; http://www.dvetelepresence.com/products/eyeContactSilhouette.asp.

Gluckman, Joshua, et al., "Rectified Catadioptric Stereo Sensors," 8 pages, retrieved and printed on May 17, 2010; http://cis.poly.edu/~gluckman/papers/cypr00.pdf.

Gundavelli, S., et al., "Proxy Mobile IPv6," Network Working Group, RFC 5213, Aug. 2008, 93 pages; http://tools.ietf.org/pdf/rfc5213.pdf.

Hepper, D., "Efficiency Analysis and Application of Uncovered Background Prediction in a Low BitRate Image Coder," IEEE Transactions on Communications, vol. 38, No. 9, pp. 1578-1584, Sep. 1990.

Jamoussi, Bamil, "Constraint-Based LSP Setup Using LDP," MPLS Working Group, Sep. 1999, 34 pages; http://tools.ietf.org/html/draft-ietf-mpls-cr-ldp-03.

Jeyatharan, M., et al., "3GPP TFT Reference for Flow Binding," MEXT Working Group, Mar. 2, 2010, 11 pages; http:/www.ietf.org/id/draft-jeyatharan-mext-flow-tftemp-reference-00.txt.

Kollarits, R.V., et al., "34.3: An Eye Contact Camera/Display System for Videophone Applications Using a Conventional Direct-View LCD," © 1995 SID, ISSN0097-0966X/95/2601, pp. 765-768; http://citeseerx.ist.psu.edu/viewdoc/download;jsessionid=
47A1E7E028C26503975E633895D114EC?doi=10.1.1.42.1772
&rep=rep1&type,=pdf.

Kolsch, Mathias, "Vision Based Hand Gesture Interfaces for Wearable Computing and Virtual Environments," A Dissertation submitted in partial satisfaction of the requirements for the degree of Doctor of Philosophy in Computer Science, University of California, Santa Barbara, Nov. 2004, 288 pages; http://fulfillment.umi.com/dissertations/b7afbcb56ba72fdb14d26dfccc6b470f/1291487062/3143800.pdf.

Marvin Imaging Processing Framework, "Skin-colored pixels detection using Marvin Framework," video clip, YouTube, posted Feb. 9, 2010 by marvinproject, 1 page; http://www.youtube.com/user/marvinproject#p/a/u/0/3ZuQHYNlcrl.

(56) References Cited

OTHER PUBLICATIONS

Miller, Paul, "Microsoft Research patents controller-free computer input via EMG muscle sensors" Engadget.com, Jan. 3, 2010, 1 page; http://www.engadget.com/2010/01/03/microsoft-research-patents-controller-free-computer-input-via-em/.

Oh, Hwang-Seok, et al., "Block-Matching Algorithm Based on Dynamic Search Window Adjustment," Dept. of CS, KAIST, 1997, 6 pages; http://citeseerx.ist.psu.edu/viewdoc/similar?doi=10.1.1.29.8621&type=ab.

PCT International Preliminary Report on Patentability mailed Aug. 26, 2010 for PCT/US2009/001070; 10 pages.

PCT International Preliminary Report on Patentability mailed Oct. 7, 2010 for PCT/US2009/038310; 10 pages.

PCT International Report of Patentability dated May 15, 2006, for PCT International Application PCT/US2004/021585, 6 pages.

PCT International Search Report mailed Aug. 24, 2010 for PCT/US2010033880; 4 pages.

"Real-time Hand Motion/Gesture Detection for HCI-Demo 2," video clip, YouTube, posted Dec. 17, 2008 by smmy0705, 1 page; www.youtube.com/watch?v=mLT4CFLIi8A&feature=related.

"Simple Hand Gesture Recognition," video clip, YouTube, posted Aug. 25, 2008 by pooh8210, 1 page; http://www.youtube.com/watch?v=F8GVeV0dYLM&feature=related.

Soliman, H., et al., "Flow Bindings in Mobile IPv6 and NEMO Basic Support," IETF MEXT Working Group, Nov. 9, 2009, 38 pages; http://tools.ietf.org/html/draft-ietf-mext-flow-binding-04.

Sudan, Ranjeet, "Signaling in MPLS Networks with RSVP-TE-Technology Information," Telecommunications, Nov. 2000, 3 pages; http://findarticles.com/p/articles/mi_mOTLC/is_11_34/ai_67447072/.

Trevor Darrell, "A Real-Time Virtual Mirror Display," 1 page, Sep. 9, 1998; http://people.csail.mit.edu/trevor/papers/1998-021/node6.html.

Wachs, J., et al., "A Real-time Hand Gesture System Based on Evolutionary Search," Vision, 3rd Quarter 2006, vol. 22, No. 3, 18 pages; http://web.ics.purdue.edu/~jpwachs/papers/3q06vi.pdf.

Wang, Robert and Jovan Popovic, "*Bimanual rotation and scaling*," video clip, YouTube, posted by rkeltset on Apr. 14, 2010, 1 page; http://www.youtube.com/watch?v=7TPFSCX79U.

Wang, Robert and Jovan Popovic, "Desktop virtual reality," video clip, YouTube, posted by rkeltset on Apr. 8, 2010, 1 page; http://www.youtube.com/watch?v=9rBtm62Lkfk.

Wang, Robert and Jovan Popovic, "Gestural user input," video clip, YouTube, posted by rkeltset on May 19, 2010, 1 page; http://www.youtube.com/watch?v=3JWYTtBjdTE.

Wang, Robert and Jovan Popovic, "Manipulating a virtual yoke," video clip, YouTube, posted by rkeltset on Jun. 8, 2010, 1 page; http://www.youtube.com/watch?v=UfgGOO2uM.

Wang, Robert and Jovan Popovic, "Real-Time Hand-Tracking with a Color Glove, ACM Transaction on Graphics," 4 pages, [Retrieved and printed on Dec. 1, 2010] http://people.csail.mit.edu/rywang/hand.

Wang, Robert and Jovan Popovic, "Real-Time Hand-Tracking with a Color Glove, ACM Transaction on Graphics" (SIGGRAPH 2009), 28(3), Aug. 2009; 8 pages http://people.csail.mit.edu/rywang/handtracking/s09-hand-tracking.pdf.

Wang, Robert and Jovan Popovic, "Tracking the 3D pose and configuration of the hand," video clip, YouTube, posted by rkeltset on Mar. 31, 2010, 1 page; http://www.youtube.com/watch?v=JOXwJkWP6Sw.

"Wi-Fi Protected Setup," from Wikipedia, Sep. 2, 2010, 3 pages http://en.wikipedia.org/wiki/Wi-Fi_Protected_Setup.

Xia, F., et al., "Home Agent Initiated Flow Binding for Mobile IPv6," Network Working Group, Oct. 19, 2009, 15 pages; http://tools.ietf.orghtml/draft-xia-mext-ha-init-flow-binding-01.txt.

Yegani, P. et al., "GRE Key Extension for Mobile IPv4," Network Working Group, Feb. 2006, 11 pages; http://tools.ietf.org/pdf/draft-yegani-gre-key-extension-01.pdf.

Zhong, Ren, et al., "Integration of Mobile IP and MPLS," Network Working Group, Jul. 2000, 15 pages; http://tools.ietf.org/html/draft-zhong-mobile-ip-mpls-01.

"Oblong Industries is the developer of the g-speak spatial operation environment," Oblong Industries Information Page, 2 pages, [Retrieved and printed on Dec. 1, 2010] http://oblong.com.

Underkoffler, John, "G-Speak Overview 1828121108," video clip, Vimeo.com, 1 page, [Retrieved and printed on Dec. 1, 2010] http://vimeo.com/2229299.

Kramer, Kwindla, "Mary Ann de Lares Norris at Thinking Digital," Oblong Industries, Inc. Web Log, Aug. 24, 2010; 1 page; http://oblong.com/articles/0BS6hEeJmoHoCwgJ.html.

"Mary Ann de Lares Norris," video clip, Thinking Digital 2010 Day Two, Thinking Digital Videos, May 27, 2010, 3 pages; http://videos.thinkingdigital.co.uk/2010/05/mary-ann-de-lares-norris-oblong/.

Kramer, Kwindla, "Oblong at TED," Oblong Industries, Inc. Web Log, Jun. 6, 2010, 1 page; http://oblong.com/article/0B22LFIS1NVyrOmR.html.

Video on TED.com, Pranav Mistry: the Thrilling Potential of SixthSense Technology (5 pages) and Interactive Transcript (5 pages), retrieved and printed on Nov. 30, 2010; http://www.ted.com/talks/pranav_mistry_the_thrilling_potential_of_sixthsense_technology.html.

"John Underkoffler points to the future of UI," video clip and Interactive transcript, Video on TED.com, Jun. 2010, 6 pages; http://www.ted.com/talks/john_underkoffler_drive_3d_data_with_a_gesture.html.

Kramer, Kwindla, "Oblong on Bloomberg TV," Oblong Industries, Inc. Web Log, Jan. 28, 2010, 1 page; http://oblong.com/article/0AN_1KD9q990PEnw.html.

Kramer, Kwindla, "g-speak at RISD, Fall 2009," Oblong Industries, Inc. Web Log, Oct. 29, 2009, 1 page; http://oblong.com/article/09uW060q6xRIZYvm.html.

Kramer, Kwindla, "g-speak + TMG," Oblong industries, Inc. Web Log, Mar. 24, 2009, 1 page; http://oblong.com/article/08mM77zpYMm7kFtv.html.

"g-stalt version 1," video clip, YouTube.com, posted by zigg1es on Mar. 15, 2009, 1 page; http://youtube.com/watch?v=k8ZAql4mdvk.

Underkoffler, John, "Carlton Sparrell speaks at MIT," Oblong Industries, Inc. Web Log, Oct. 30, 2009, 1 page; http://oblong.com/article/09usAB411Ukb6CPw.html.

Underkoffler, John, "Carlton Sparrell at MIT Media Lab," video clip, Vimeo.com, 1 page, [Retrieved and printed Dec. 1, 2010] http://vimeo.com/7355992.

Underkoffler, John, "Oblong at Altitude: Sundance 2009," Oblong Industries, Inc. Web Log, Jan. 20, 2009, 1 page; http://oblong.com/article/08Sr62ron_2akg0D.html.

Underkoffler, John, "Oblong's tamper system 1801011309," video clip, Vimeo.com, 1 page, [Retrieved and printed Dec. 1, 2010] http://vimeo.com/2821182.

Feld, Brad, "Science Fact," Oblong Industries, Inc. Web Log, Nov. 13, 2008, 2 pages,http://oblong.com/article/084H-PKI5Tb9l4Ti.html.

Kwindla Kramer, "g-speak in slices," Oblong Industries, Inc. Web Log, Nov. 13, 2008, 6 pages; http://oblong.com/article/0866JqfNrFg1NeuK.html.

Underkoffler, John, "Origins: arriving here," Oblong Industries, Inc. Web Log, Nov. 13, 2008, 5 pages; http://oblong.com/article/085zBpRSY9JeLv2z.html.

Rishel, Christian, "Commercial overview: Platform and Products," Oblong Industries, Inc., Nov. 13, 2008, 3 pages; http://oblong.com/article/086E19gPvDcktAf9.html.

U.S. Appl. No. 13/036,925, filed Feb. 28, 2011, entitled "System and Method for Selection of Video Data in a Video Conference Environment," Inventor(s) Sylvia Olayinka Aya Manfa N'guessan.

U.S. Appl. No. 13/096,772, filed Apr. 28, 2011, entitled "System and Method for Providing Enhanced Eye Gaze in a Video Conferencing Environment," Inventor(s): Charles C. Byers.

U.S. Appl. No. 13/106,002, filed May 12, 2011, entitled "System and Method for Video Coding in a Dynamic Environment," Inventors: Dihong Tian et al.

(56) References Cited

OTHER PUBLICATIONS

U.S. Appl. No. 13/098,430, filed Apr. 30, 2011, entitled "System and Method for Transferring Transparency Information in a Video Environment," Inventors: Eddie Collins et al.
U.S. Appl. No. 13/096,795, filed Apr. 28, 2011, entitled "System and Method for Providing Enhanced Eye Gaze in a Video Conferencing Environment," Inventors: Charles C. Byers.
Design U.S. Appl. No. 29/389,651, filed Apr. 14, 2011, entitled "Video Unit With Integrated Features," Inventor(s): Kyle A. Buzzard et al.
Design U.S. Appl. No. 29/389,654, filed Apr. 14, 2011, entitled "Video Unit With Integrated Features," Inventor(s): Kyle A. Buzzard et al.
"Eye Tracking," from Wikipedia, (printed on Aug. 31, 2011) 12 pages; http://en.wikipedia.org/wiki/Eye_tracker.
"RoundTable, 360 Degrees Video Conferencing Camera unveiled by Microsoft," TechShout, Jun. 30, 2006, 1 page; http://www.techshout.com/gadgets/2006/30/roundtable-360-degrees-video-conferencing-camera-unveiled-by-microsoft/#.
"Vocative Case," from Wikipedia, [retrieved and printed on Mar. 3, 2011] 11 pages; http://en.wikipedia.org/wiki/Vocative_case.
Andreopoulos, Yiannis, et al., "In-Band Motion Compensated Temporal Filtering," Signal Processing: Image Communication 19 (2004) 653-673, 21 pages http://medianetiab.ee.ucla.edu/papers/011.pdf.
Arulampalam, M. Sanjeev, et al., "A Tutorial on Particle Filters for Online Nonlinear/Non-Gaussian Bayesian Tracking," IEEE Transactions on Signal Processing, vol. 50, No. 2, Feb. 2002, 15 pages http://www.cs.ubc.ca/~murphyk/Software/Kalman/ParticleFilterTutorial.pdf.
Boros, S., "Policy-Based Network Management with SNMP," Proceedings of the EUNICE 2000 Summer School Sep. 13-15, 2000, p. 3.
Cumming, Jonathan, "Session Border Control in IMS, An Analysis of the Requirements for Session Border Control in IMS Networks," Sections 1.1, 1.1.1, 1.1.3, 1.1.4, 2.1.1, 3.2, 3.3.1, 5.2.3 and pp. 7-8, Data Connection, 2005.
Dornaika F., et al., "Head and Facial Animation Tracking Using Appearance-Adaptive Models and Particle Filters," Jun. 27, 2004; Jun. 27, 2004-Jun. 2, 2004, 22 pages; HEUDIASY Research Lab, http://eprints.pascal-network.org/archive/00001231/01/rtvhci_chapter8.pdf.
Eisert, Peter, "Immersive 3-D Video Conferencing: Challenges, Concepts and Implementations," Proceedings of SPIE Visual Communications and Image Processing (VCIP), Lugano, Switzerland, Jul. 2003; 11 pages; http://iphome.hhi.de/eisert/papers/vcip03.pdf.
EPO Aug. 15, 2011 Response to EPO Communication mailed Feb. 25, 2011 from European Patent Application No. 09725288.6; 15 pages.
EPO Communication dated Feb. 25, 2011 for EP09725288.6 (published as EP22777308); 4 pages.
France Telecom R&D, "France Telecom's Magic Telepresence Wall—Human Productivity Lab," 5 pages, retrieved and printed on May 17, 2010; http://www.humanproductivitylab.com/archive_blogs/2006/07/11/france_telecoms_magic_telepres_1.php.
Garg, Ashutosh, et al., "Audio-Visual ISpeaker Detection Using Dynamic Bayesian Networks," IEEE International Conference on Automatic Face and Gesture Recognition, 2000 Proceedings, 7 pages http://www.ifp.illinois.edu/~ashutosh/papers/FG00.pdf.
Geys et al., "Fast Interpolated Cameras by Combining a GPU Based Plane Sweep With a Max-Flow Regularisation Algorithm," Sep. 9, 2004; 3D Data Processing, Visualization and Transmission 2004, pp. 534-541.
Gussenhoven, Carlos, "Chapter 5 Transcription of Dutch Intonation," Nov. 9, 2003, 33 pages; http://www.ru.nl/publish/pages/516003/todisun-ah.pdf.
Hammadi, Nait Charif et al., "Tracking the Activity of Participants in a Meeting," Machine Vision and Applications, Springer. Berlin, De Lnkd—DOI:10.1007/S00138-006-0015-5, vol. 17, No. 2, May 1, 2006, pp. 83-93, XP019323925 http://citeseerx.ist.psu.edu/viewdoc/summary?doi=10.1.1.106.9832.

Hock, Hans Henrich, "Prosody vs. Syntax: Prosodic rebracketing of final vocatives in English," 4 pages; [retrieved and printed on Mar. 3, 2011] http://speechprosody2010.illinois.edu/papers/100931.pdf.
Jong-Gook Ko et al., "Facial Feature Tracking and Head Orientation-Based Gaze Tracking," ITC-CSCC 2000, International Technical Conference on Circuits/Systems, Jul. 11-13, 2000, 4 pages http://www.umiacs.umd.edu/~knkim/paper/itc-cscc-2000-jgko.pdf.
Kwolek, B., "Model Based Facial Pose Tracking Using a Particle Filter," Geometric Modeling and Imaging—New Trends, 2006 London, England Jul. 5-6, 2005, Piscataway, NJ, USA, IEEE LNKD-DOI. 10.1109/GMAI.2006.34 Jul. 5, 2006, pp. 203-208; XP010927285 [Abstract Only].
Lambert, "Polycom Video Communications," © 2004 Polycom, Inc., Jun. 20, 2004 http://www.polycom.com/global/documents/whitepapers/video_communications_h.239_people_content_polycom_patented_technology.pdf.
Liu, Shan, et al., "Bit-Depth Scalable Coding for High Dynamic Range Video," SPIE Conference on Visual Communications and Image Processing, Jan. 2008; 12 pages; http://www.merl.com/papers/docs/TR2007-078.pdf.
Nakaya, Y., et al. "Motion Compensation Based on Spatial Transformations," IEEE Transactions on Circuits and Systems for Video Technology, Jun. 1994, Abstract Only http://ieeexplore.ieee.org/Xplore/login.jsp?url=http%3A%2F%2Fieeexplore.ieee.org%2Fiel5%2F76%2F7495%2F00305878.pdf%3Farnumber%3D305878&authDecision=-203.
Patterson, E.K., et al., "Moving-Talker, Speaker-Independent Feature Study and Baseline Results Using the CUAVE Multimodal Speech Corpus," EURASIP Journal on Applied Signal Processing, vol. 11, Oct. 2002, 15 pages http://www.clemson.edu/ces/speech/papers/CUAVE_Eurasip2002.pdf.
PCT Sep. 25, 2007 Notification of Transmittal of the International Search Report from PCT/US06/45895.
PCT Sep. 2, 2008 International Preliminary Report on Patentability (1 page) and the Written Opinion of th ISA (4 pages) from PCT/US2006/045895.
PCT Sep. 11, 2008 Notification of Transmittal of the International Search Report from PCT/US07/09469.
PCT Nov. 4, 2008 International Preliminary Report on Patentability (1 page) and the Written Opinion of the ISA (8 pages) from PCT/US2007/009469.
PCT May 11, 2010 International Search Report from PCT/US2010/024059; 4 pages.
PCT Aug. 23, 2011 International Preliminary Report on Patentability and Written Opinion of the ISA from PCT/US2010/024059; 6 pages.
Perez, Patrick, et al., "Data Fusion for Visual Tracking with Particles," Proceedings of the IEEE, vol. XX, No. XX, Feb. 2004, 18 pages http://citeseer.ist.psu.edu/viewdoc/summary?doi=10.1.1.6.2480.
Potamianos, G., et a., "An Image Transform Approach for HMM Based Automatic Lipreading," in Proceedings of IEEE ICIP, vol. 3, 1998, 5 pages http://citeseerx.ist.psu.edu/viewdoc/summary?doi=10.1.1.13.6802.
Richardson, Iain, et al., "Video Encoder Complexity Reduction by Estimating Skip Mode Distortion," Image Communication Technology Group; [Retrieved and printed Oct. 21, 2010] 4 pages; http://www4.rgu.ac.uk/files/ICIP04_richardson_zhao_final.pdf.
Rikert, T.D., at al., "Gaze Estimation using Morphable models," IEEE International Conference on Automatic Face and Gesture Recognition, Apr. 1998; 7 pgs http://citeseer.ist.psu.edu/viewdoc/summary?doi=10.1.1.30.9472.
Tan, Kar-Han, et al., "Appearance-Based Eye Gaze Estimation," In Proceedings IEEE WACV'02, 2002, 5 pages http://citeseer.ist.psu.edu/viewdoc/summary?doi=10.1.1.19.8921.
Veratech Corp., "Phantom Sentinel," © VeratechAero 2006, 1 page; http://www.veratechcorp.com/phantom.html.
Vertegaal, Roel, et al., "GAZE-2: Conveying Eye Contact Group Video Conferencing Using Eye-Controlled Camera Direction," CHI 2003, Apr. 5-10, 2003, Fort Lauderdale, FL; Copyright 2003 ACM 1-58113-630-7/03/0004; 8 pages; http://www.hml.queensu.ca/papers/vertegaalchi0403.pdf.

(56) References Cited

OTHER PUBLICATIONS

Weinstein et al., "Emerging Technologies for Teleconferencing and Telepresence," Wainhouse Research 2005; http://www.ivci.com/pdf/whitepaper-emerging-technologies-for-teleconferencing-and-telepresence.pdf.
Yang, Ruigang, et al., "Real-Time Consensus-Based Scene Reconstruction using Commodity Graphics Hardware," Department of Computer Science, University of North Carolina at Chapel Hill; 2002; http://www.cs.unc.edu/Research/stc/publications/yang_pacigra2002.pdf; 10 pgs.
OptoIQ, ""Vision + Automation Products—VideometerLab 2,"" [retrieved and printed on Mar. 18, 2010], http://www.optoiq.com/optoiq-2/en-us/index/machine-vision-imaging-processing/display/vsd-articles-tools-template.articles.vision-systems-design.volume-11.issue-10.departments.new-products.vision-automation-products.htmlhtml; 11 pages.
EPO Nov. 3, 2011 Communication from European Application EP10710949.8; 2 pages.
EPO Mar. 12, 2012 Response to EP Communication dated Nov. 3, 2011 from European Application EP10710949.8; 15 pages.
EPO Mar. 20, 2012 Communication from European Application 09725288.6; 6 pages.
Cisco: Bill Mauchly and Mod Marathe; UNC: Henry Fuchs, et al., "Depth-Dependent Perspective Rendering," Apr. 15, 2008; 6 pages.
Bakstein, Hynek, et al., "Visual Fidelity of Image Based Rendering," Center for Machine Perception, Czech Technical University, Proceedings of the Computer Vision, Winter 2004, http://www.benogo.dk/publications/Bakstein-Pajdla-CVWW04.pdf; 10 pages.
U.S. Appl. No. 12/234,291, filed Sep. 19, 2008, entitled "System and Method for Enabling Communication Sessions in a Network Environment," Inventor(s): Yifan Gao et al.
U.S. Appl. No. 12/366,593, filed Feb. 5, 2009, entitled "System and Method for Depth Perspective Image Rendering," Inventor(s): J. William Mauchly et al.
U.S. Appl. No. 12/475,075, filed May 29, 2009, entitled "System and Method for Extending Communications Between Participants in a Conferencing Environment," Inventor(s): Brian J. Baldino et al.
U.S. Appl. No. 12/400,540, filed Mar. 9, 2009, entitled "System and Method for Providing Three Dimensional Video Conferencing in a Network Environment," Inventor(s): Karthik Dakshinamoorthy et al.
U.S. Appl. No. 12/400,582, filed Mar. 9, 2009, entitled "System and Method for Providing Three Dimensional Imaging in a Network Environment," Inventor(s): Shmuel Shaffer et al.
U.S. Appl. No. 12/539,461, filed Aug. 11, 2009, entitled "System and Method for Verifying Parameters in an Audiovisual Environment," Inventor: James M. Alexander.
U.S. Appl. No. 12/463,505, filed May 11, 2009, entitled "System and Method for Translating Communications Between Participants in a Conferencing Environment," Inventor(s): Marthinus F. De Beer et al.
U.S. Appl. No. 12/727,089, filed Mar. 18, 2010, entitled "System and Method for Enhancing Video Images in a Conferencing Environment," Inventor: Joseph T. Friel.
U.S. Appl. No. 12/784,257, filed May 20, 2010, entitled "Implementing Selective Image Enhancement," Inventors: Dihong Tian et al.
"3D Particles Experiments in AS3 and Flash CS3," printed Mar. 18, 2010, 2 pages; http://www.flashandmath.com/advanced/fourparticles/notes.html.
Active8-3D—Holographic Projection—3D Hologram Retail Display & Video Project, [retrieved Feb. 24, 2009], http://www.activ8-3d.co.uk/3d_holocubes. 1 page.
Avrithis, Y., et al., "Color-Based Retrieval of Facial Images," European Signal Processing Conference [EUSIPCO '00], Tampere, Finland; Sep. 2000; 18 pages.
Boccaccio, Jeff; CEPro, "Inside HDMI CEC: The Little-Known Control Feature," http://www.cepro.com/article/print/inside_hdmi_cec_the_little_known_control_feature; Dec. 28, 2007, 2 pages.
Bücken R: "Bildfernsprechen: Videokonferenz vom Arbeitsplatz aus" Funkschau, Weka Fachzeitschriften Verlag, Poing, DE, No. 17, Aug. 14, 1986, pp. 41-43, XP002537729; ISSN: 0016-2841, p. 43, left-hand column, line 34-middle column, line 24; 3pgs.
Chen, Jason, "iBluetooth Lets iPhone Users Send and Receive Files Over Bluetooth," Mar. 13, 2009; 1 page; http://i.gizmodo.com/5169545/ibluetooth-lets-iphone-users-send-and-receive-files-over-bluetooth.
Costa, Cristina, et al., "Quality Evaluation and Nonuniform Compression of Geometrically Distorted Images Using the Quadtree Distorion Map," EURASIP Journal on Applied Signal Processing, vol. 2004, No. 12; pp. 1899-1911; © 2004 Hindawi Publishing Corp.; XP002536356; ISSN: 1110-8657; 16 pages.
Criminisi, A., et al., "Efficient Dense-Stereo and Novel-view Synthesis for Gaze Manipulation in One-to-one Teleconferencing," Technical Rpt MSR-TR-2003-59, Sep. 2003 [retrieved Feb. 26, 2009], http://research.microsoft.com/pubs/67266/criminis_techrep2003-59.pdf, 41 pages.
Daly, S., et al., "Face-based visually-optimized image sequence coding," Image Processing, 1998. ICIP 98. Proceedings; 1998 International Conference on Chicago, IL; Oct. 4-7, 1998, Los Alamitos; IEEE Computing; vol. 3, Oct. 4, 1998; pp. 443-447, ISBN: 978-0-8186-8821-8; XP010586786, 5 pages.
Diaz, Jesus, iPhone Bluetooth File Transfer Coming Soon (YES!); Jan. 25, 2009; 1 page; http://i.gizmodo.com/5138797/iphone-bluetooth-file-transfer-coming-soon-yes.
Diaz, Jesus, "Zcam 3D Camera is Like Wii Without Wiimote and Minority Report Without Gloves," Dec. 15, 2007, 3 pgs.; http://gizmodo.com/gadgets/zcam-depth-camera-could-be-wii-challenger/zcam-3d-camera-is-like-wii-without-wiimote-and-minority-report-without-gloves-334426.php.
DVE Digital Video Enterprises, "DVE Tele-Immersion Room," http://www.dvetelepresence.com/products/immersion_room.asp; 2009, 2 pgs.
"Dynamic Displays," copyright 2005-2008 [retrieved Feb. 24, 2009], http://www.zebraimaging.com/html/lighting_display.html, 2 pages.
ECmag.com, "IBS Products," Published Apr. 2009, 2 pages; http://www.ecmag.com/index.cfm?fa=article&articleID=10065.
Electrophysics Glossary, "Infrared Cameras, Thermal Imaging, Night Vison, Roof Moisture Detection," printed Mar. 18, 2010, 11 pages; http://www.electrophysics.com/Browse/Brw_Glossory.asp.
Farrukh, A., et al., Automated Segmentation of Skin-Tone Regions in Video Sequences, Proceedings IEEE Students Conference, ISCON_apos_02; Aug. 16-17, 2002; pp. 122-128; 7pgs.
Fiala, Mark, "Automatic Projector Calibration Using Self-Identifying Patterns," National Research Council of Canada, 2005; http://www.procams.org/procams2005/papers/procams05-36.pdf; 6 pages.
Freeman, Professor Wilson T., Computer Vision Lecture Slides, "6.869 Advances in Computer Vision: Learning and Interfaces," Spring 2005; 21 pages.
Gemmell, Jim, et al., "Gaze Awareness for Video-conferencing: A Software Approach," IEEE MultiMedia, Oct.-Dec. 2000; 10 pages.
Gotchev, Atanas, "Computer Technologies for 3D Video Delivery for Home Entertainment," International Conference on Computer Systems and Technologies; CompSysTech '08: 6 pgs; http://ecet.ecs.ru.acad.bg/cst08/docs/cp/Plenary/P.1.pdf.
Gries, Dan, "3D Particles Experiments in AS3 and Flash CS3, Dan's Comments," printed May 24, 2010 http://www.flashandmath.com/advanced/fourparticles/notes.html; 3pgs.
Guernsey, Lisa, "Toward Better Communication Across the Language Barrier," Jul. 29, 1999, http://www.nytimes.com/1999/07/29/technology/toward-better-communication-across-the-language-barrier.html; 2 pages.
Habili, Nariman, et al., "Segmentation of the Face and Hands in Sign Language Video Sequences Using Color and Motion Cues" IEEE Transaction on Circuits and Systems for Video Technology, IEEE Service Center, vol. 14, No. 8, Aug. 1, 2004; ISSN: 1051-8215; pp. 1086-1097; XP011115755; 13 pages.
Holographic Imaging, "Dynamic Holography for scientific uses, military heads up display and even someday HoloTV Using TI's DMD," [retrieved Feb. 26, 2009], http://innovation.swmed.edu/research/instrumentation/res_inst_dev3d.html, 5 pages.

(56) References Cited

OTHER PUBLICATIONS

Hombeck, Larry J., "Digital Light Processing™: A New MEMS-Based Display Technology," [retrieved Feb. 26, 2009]; http://focus.ti.com/pdfs/dlpdmd/17_Digital_Light_Processing_MEMS_display_technology.pdf, 22 pages.

"Infrared Cameras TVS-200-EX," printed May 24, 2010; 3 pgs.; http://www.electrophysics.com/Browse/Brw_ProductLineCategory.asp?CategoryID=184&Area=IS.

IR Distribution Category @ Envious Technology, "IR Distribution Category," 2 pages http://www.envioustechnology.com.au/products/product-list.php?CID=305, printed on Apr. 22, 2009.

IR Trans—Products and Orders—Ethernet Devices, 2 pages http://www.irtrans.de/en/shop/lan.php, printed on Apr. 22, 2009.

Isgro, Francesco et al., "Three-Dimensional Image Processing in the Future of Immersive Media," IEEE Transactions on Circuits and Systems for Video Technology, vol. 14, No. 3; XP011108796; ISSN: 1051-8215; Mar. 1, 2004; pp. 288-303; 16 pages.

Itoh, Hiroyasu, et al., "Use of a gain modulating framing camera for time-resolved imaging of cellular phenomena," SPIE vol. 2979, 1997, pp. 733-740; 8 pages.

Kauff, Peter, et al., "An Immersive 3D Video-Conferencing System Using Shared Virtual Team User Environments," Proceedings of the 4th International Conference on Collaborative Virtual Environments, XP040139458; Sep. 30, 2002; 8 pages.

Kazutake, Uehira, "Simulation of 3D image depth perception in a 3D display using two stereoscopic displays at different depths," http://adsabs.harvard.edu/abs/2006SPIE.6055.408U; 2006, 2 pgs.

Keijser, Jeroen, et al., "Exploring 3D Interaction in Alternate Control-Display Space Mappings," IEEE Symposium on 3D User Interfaces, Mar. 10-11, 2007, pp. 17-24; 8 pages.

Klint, Josh, "Deferred Rendering in Leadwerks Engine," Copyright Leadwersk Corporation 2008, 10 pages; http://www.leadwerks.com/files/Deferred_Rendering_in_Leadwerks_Engine.pdf.

Koyama, S., et al. "A Day and Night Vision MOS Imager with Robust Photonic-Crystal-Based RGB-and-IR," Mar. 2008, pp. 754-759; ISSN: 0018-9383; IEE Transactions on Electron Devices, vol. 55, No. 3; 6 pages http://ieeexplore.iee.org/stamp/stamp.jsp?tp=&arnumber=4455782&isnumber=4455723.

Lawson, S., "Cisco Plans TelePresence Translation Next Year," Dec. 9, 2008; http://www.pcworld.com/article/155237/.html?tk=rss_news; 2 pages.

Miller, Gregor, et al., "Interactive Free-Viewpoint Video," Centre for Vision, Speech and Signal Processing, [retrieved Feb. 26, 2009], http://www.ee.surrey.ac.uk/CVSSP/VMRG/Publications/miller05cvmp.pdf, 10 pages.

"Minoru from Novo is the worlds first consumer 3D Webcam," Dec. 11, 2008 [retrieved Feb. 24, 2009], http://www.minoru3d.com, 4 pages.

Mitsubishi Electric Research Laboratories, copyright 2009, [Retrieved Feb. 26, 2009], http://www.merl.com/projects/3dtv, 2 pages.

National Training Systems Association Home—Main, Interservice/Industry Training, Simulation & Education Conference, Dec. 1-4, 2008 [retrieved Feb. 26, 2009], http://ntsa.metapress.com/app/home/main.asp?referrer=default, 1 page.

OptoIQ, "Anti-Speckle Techniques Uses Dynamc Optics," Jun. 1, 2009, 2 pages; http://www.optoiq.com/index/photonics-technologies-applications/lfw-display/lfw-article-display/363444/articles-optoiQ2/photonics-technologies/technology-products/optical-components/optical-mems/2009/12/anti-speckle-technique-uses-dynamic-optics/QP129867/cmpid=EnlOptoLFWJanuary132010.html.

OptoIQ, "Smart Camera Supports Multiple Interfaces," Jan. 22, 2009, 2 pages; http://www.optoiq.com/index/machine-vision-imaging-processing/display/vsd-article-display/350639/articles/vision-systems-design/daily-product-2/2009/01/smart-camera-supports-multiple-interfaces.html.

OptoIQ, "Vision Systems Design—Machine Vision and Image Processing Technology," printed Mar. 18, 2010, 2 pages; http://www.optoiq.com/index/machine-vision-imaging-processing.html.

PCT "Notification of Transmittal of the International Search Report and the Written Opinion of the International Searching Authority, or the Declaration," PCT/US2009/001070, dated Apr. 8, 2009, 17 pages.

PCT Notification of Transmittal of the International Search Report and the Written Opinion of the International Searching Authority, or the Declaration; PCT/US2009/038310, dated Oct. 10, 2009, 19 pages.

Radhika, N., et al., "Mobile Dynamic reconfigurable Context aware middleware for Adhoc smart spaces," vol. 22, 2008, 3 pages http://www.acadjournal.com/2008/V22/part6/p7.

"Rayvel Business-to-Business Products," copyright 2004 [retrieved Feb. 24, 2009], http://www.rayvel.com/b2b.html, 2 pages.

"Robust Face Localisation Using Motion, Colour & Fusion" Dec. 10, 2003; Proc. Vilth Digital Image Computing: Techniques and Applications, Sun C. et al (Eds.), Sydney; 10 pgs. Retrieved from the Internet: http://www.cmis.csiro.au/Hugues.Talbot/dicta2003/cdrom/pdf/0899.pdf; pp. 899-908, XP007905630.

School of Computing, "Bluetooth over IP for Mobile Phones," 1 page http://www.computing.dcu.ie/wwwadmin/fyp-abstract/list/fyp_details05.jsp?year=2005&number=51470574.

SENA, "Industrial Bluetooth," 1 page http://www.sena.com/products/industrial_bluetooth, printed Apr. 22, 2009.

Shaffer, Shmuel, "Translation—State of the Art" presentation; Jan. 15, 2009; 22 pages.

Shi, C. et al., "Automatic Image Quality Improvement for Videoconferencing," IEEE ICASSP © 2004, 4 pgs.

Smarthome, "IR Extender Expands Your IR Capabilities," 3 pages http://www.smarthome.com/8121.html, printed Apr. 22, 2009.

Soohuan, Kim, et al., "Block-based face detection scheme using face color and motion estimation," Real-Time Imaging VIII; Jan. 20-22, 2004, San Jose, CA; vol. 5297, No. 1; Proceedings of the SPIE—The International Society for Optical Engineering SPIE—Int. Soc. Opt. Eng USA ISSN: 0277-786X; pp. 78-88; XP007905596; 11pgs.

"Super Home Inspectors or Super Inspectors," printed Mar. 18, 2010, 3 pages; http://www.umrt.com/PageManager/Default.aspx/PageID=2120325.

Total Immersion, Video Gallery, copyright 2008-2009 [retrieved Feb. 26, 2009], http://www.t-immersion.com/en,video-gallery,36.html, 1 page.

Trucco, E., et al., "Real-Time Disparity Maps for Immersive 3-D Teleconferencing by Hybrid Recursive Matching and Census Transform," 9 pages; retrieved and printed from the website on May 4, 2010 from http://server.cs.ucf.edu/~vision/papers/VidReg-final.pdf.

Tsapatsoulis, N., et al., "Face Detection for Multimedia Applications," Proceedings of the ICIP '00: Vancouver, BC, Canada; Sep. 2000; 4 pages.

Tsapatsoulis, N., et al., "Face Detection in Color Images and Video Sequences," $10^{th}$ Mediterranean Electrotechnical Conference (MELECON), 2000; vol. 2, pp. 498-502; 21 pgs.

Wang, Hualu, et al., "A Highly Efficient System for Automatic Face Region Detection in MPEG Video," IEEE Transactions on Circuits and Systems for Video Technology; vol. 7, Issue 4; 1977 pp. 615-628; 26 pgs.

Wilson, Mark, "Dreamoc 3D Display Turns Any Phone Into Hologram Machine," Oct. 30, 2008 [retrieved Feb. 24, 2009], http://gizmodo.com/5070906/dreamoc-3d-display-turns-any-phone-into-hologram-machine, 2 pages.

WirelessDevNet, Melody Launches Bluetooth Over IP, http://www.wirelessdevnet.com/news/2001/155/news5.html; 2 pages, printed on Jun. 5, 2001.

WO 2008/118887 A3 Publication with PCT International Search Report (4 pages), International Preliminary Report on Patentability (1 page), and Written Opinion of the ISA (7 pages); PCT/US2008/058079; dated Sep. 18, 2008.

Yang, Jie, et al., "A Real-Time Tracker," Proceedings $3^{rd}$ IEEE Workshop on Applications of Computer Vision; 1996; Dec. 2-4, 1996; pp. 142-147; 6 pgs.

Yang, Ming-Hsuan, et al., "Detecting Faces in Images: A Survey," vol. 24, No. 1; Jan. 2002; pp. 34-58; 25 pgs.

Yoo, Byounghun, et al., "Image-Based Modeling of Urban Buildings Using Aerial Photographs and Digital Maps," Transactions in GIS,

(56) References Cited

OTHER PUBLICATIONS vol. 10, No. 3, p. 377-394, 2006; 18 pages [retrieved May 17, 2010], http://icad,kaist.ac.kr/publication/paper_data/image_based.pdf.
Gvili, Ronen et al., "Depth Keying," 3DV System Ltd., [Retrieved and printed on Dec. 5, 2011] 11 pages; http://research.microsoft.com/en-us/um/people/eyalofek/Depth%20Key/DepthKey.pdf.
PCT Nov. 24, 2011 International Preliminary Report on Patentability from International Application Serial No. PCT/US2010/033880; 6 pages.
PCT Jan. 23, 2012 International Search Report and Written Opinion of the ISA from International Application Serial No. PCT/US2011/060579; 10 pages.
PCT Jan. 23, 2012 International Search Report and Written Opinion of the ISA from International Application Serial No. PCT/US2011/060584; 11 pages.
PCT Feb. 20, 2012 International Search Report and Written Opinion of the ISA from International Application Serial No. PCT/US2011/061442; 12 pages.
U.S. Appl. No. 13/298,022, filed Nov. 16, 2011, entitled "System and Method for Alerting a Participant in a Video Conference," Inventor(s): TiongHu Lian, et al.
PCT Sep. 13, 2011 International Preliminary Report on Patentability and the Written Opinion of the ISA from PCT/US2010/026456; 5 pages.
PCT Oct. 12, 2011 International Search Report and Written Opinion of the ISA from PCT/US2011/050380.
""Eye Gaze Response Interface Computer Aid (Erica) tracks Eye movement to enable hands-free computer operation," UMD Communication Sciences and Disorders Tests New Technology, University of Minnesota Duluth, posted Jan. 19, 2005; 4 pages. http://www.d.umn.edu/unirel/homepage/05/eyegaze.html".
PRC Dec. 18, 2012 Response to SIPO First Office Action from Chinese Application No. 200980119121.5; 16 pages.
Chien et al., "Efficient moving Object Segmentation Algorithm Using Background Registration Technique," IEEE Transactions on Circuits and Systems for Video Technology, vol. 12, No. 7, Jul. 2002, 10 pages.
EPO Sep. 24, 2012 Response to Mar. 20, 2012 EP Communication from European Application EP09725288.6.
EPO Jul. 10, 2012 Response to EP Communication from European Application EP10723445.2.
PRC Aug. 3, 2012 SIPO First Office Action from Chinese Application No. 200980119121.5; 16 pages.
PRC Jan. 7, 2013 SIPO Second Office Action from Chinese Application Serial No. 200980105262.1.
PCT Mar. 21, 2013 International Preliminary Report on Patentability from International Application Serial No. PCT/US2011/050380.
PCT May 30, 2013 International Preliminary Report on Patentability and Written Opinion from the International Searching Authority for International Application Serial No. PCT/US2011/061442 8 pages.
PCT May 30, 2013 International Preliminary Report on Patentability and Written Opinion from the International Searching Authority for International Application Serial No. PCT/US2011/060579 6 pages.
PCT May 30, 2013 International Preliminary Report on Patentability and Written Opinion from the International Searching Authority for International Application Serial No. PCT/US2011/060584 7 pages.
PRC 2013 Apr. 3, 2013 SIPO Second Office Action from Chinese Application No. 200980119121.5; 16 pages.
PRC Jun. 18, 2013 Response to SIPO Second Office Action from Chinese Application No. 200980119121.5; 5 pages.
PRC Jul. 9, 2013 SIPO Third Office Action from Chinese Application No. 200980119121.5; 15 pages.
PRC Sep. 24, 2013 Response to SIPO Third Office Action from Chinese Application No. 200980119121.5; 5 pages.

* cited by examiner

METHOD AND SYSTEM FOR VIDEOCONFERENCE CONFIGURATION

TECHNICAL FIELD

The invention generally relates to telecommunications and more specifically to video conferencing.

BACKGROUND

A videoconference "call" comprises a connection of two or more videoconferencing endpoints through a network for a period of time.

Generally, this comprises a logical connection typically through a packet-based network using Internet Protocol (IP). A multi-point videoconference comprises a call with more than two endpoints. An endpoint is a videoconferencing location (e.g., a room) that comprises resources such as cameras, displays and codecs that allow a videoconferencing system to collect and display video and audio, and to send and transmit video and audio streams across a network. Generally, a codec is a device configured to compress and decompress video and for sending and receiving compressed video streams over a network. A multi-point control unit (MCU) is an intermediary network device that handles routing in a multipoint call.

Correct eye-gaze can be a challenge in multi-screen, multi-camera and multi-point video as used in videoconferencing system. To acquire the correct viewpoints, the video cameras should be carefully placed. When a participant in a conference can see several others on a large display surface, those others may be confused as to who the participant is looking at. The position of the camera determines the viewpoint. Ideally, each participant would see a unique view of the other participants, from his or her particular perspective.

Endpoint configuration comprises arrangement of the chairs, tables, cameras, screens, network, and video processing components at a videoconferencing endpoint. In some systems, the physical positions that the conference participants are permitted to occupy are fixed and specified. Other parts of an endpoint configuration can change from call to call. For different call situations, some of the resources can be reconfigured. For instance, if a local videoconference facility has unused positions, it is possible that participants in remote locations may see an empty chair or unoccupied position. While other solutions have been suggested for determining participant presence and location in a videoconference such as motion detection, chair sensors, or presence monitoring with RFID or ID badges, each of these have drawbacks. For example, motion detection may not be able to accurately determine the number of participants or be able to discern participants closely seated. Chair sensors may require specialized equipment and decrease the ability to move chairs or reconfigure seating positions and RFID or ID badges require external infrastructure and personal encumbrance.

Call configuration comprises the routing of video streams from endpoint to endpoint. In a simple, two-point videoconference, video is streamed from point A to point B, and from point B to point A, but in other instances video is streamed to and from more than two endpoints. It is to be appreciated that there can be a plurality of video streams to and from each endpoint depending upon the number of cameras, views, displays and participants at each endpoint.

Because of network bandwidth limitations, it may not be possible to send and receive all views of all participants of each endpoint involved in a multipoint videoconference. Further, endpoint configuration parameters such as camera position, participant location, and camera selection may need to be reconfigured to better facilitate the videoconference. Therefore, it is desirable to have a multipoint conference system which would automatically choose or suggest placement of cameras and selection of video streams to improve participant gaze.

SUMMARY

Described herein are embodiments of systems and methods for providing camera configuration for endpoints (a/k/a "points") in a multi-point videoconference system.

In one aspect, first participant configuration information is determined for a first endpoint of a multi-point videoconferencing system. Participant configuration information can include, for example, the number of people at the endpoint, the number of people that can be displayed at the endpoint (i.e., the number of display screens), the current number, placement and activation of cameras that are available at the endpoint, the number of streams of video that can be encoded, etc. Second participant configuration information is determined for a second point of the multi-point videoconferencing system. One or more first camera viewpoints at the first point or one or more second camera viewpoints at the second point of the multi-point videoconferencing system are then selected based on the first participant configuration information or the second participant configuration information.

Embodiments of systems for implementing the disclosed methods are also described herein. In one aspect, an embodiment of a multi-point videoconferencing system is described. The system is comprised of a first point of the multi-point videoconferencing system. The first point is comprised of one or more first cameras, one or more first video displays, one or more first positions, and a first presence detector. A position can include, for example, chairs, kiosks, stations or similar accommodations designated for conference participants. First participant configuration information is determined by the system for the first point. The system is further comprised of a second point of the multi-point videoconferencing system. The second point is comprised of one or more second cameras, one or more second video displays screens, one or more second positions, and a second presence detector. Second participant configuration information is determined by the system for the second point. The one or more first cameras at the first point or the one or more second cameras at the second point of the multi-point videoconferencing system are reconfigured based on the first participant configuration information or the second participant configuration information.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification and are not drawn to scale, illustrate embodiments and together with the description, serve to explain the principles of the methods and systems.

DETAILED DESCRIPTION

Figure 1:
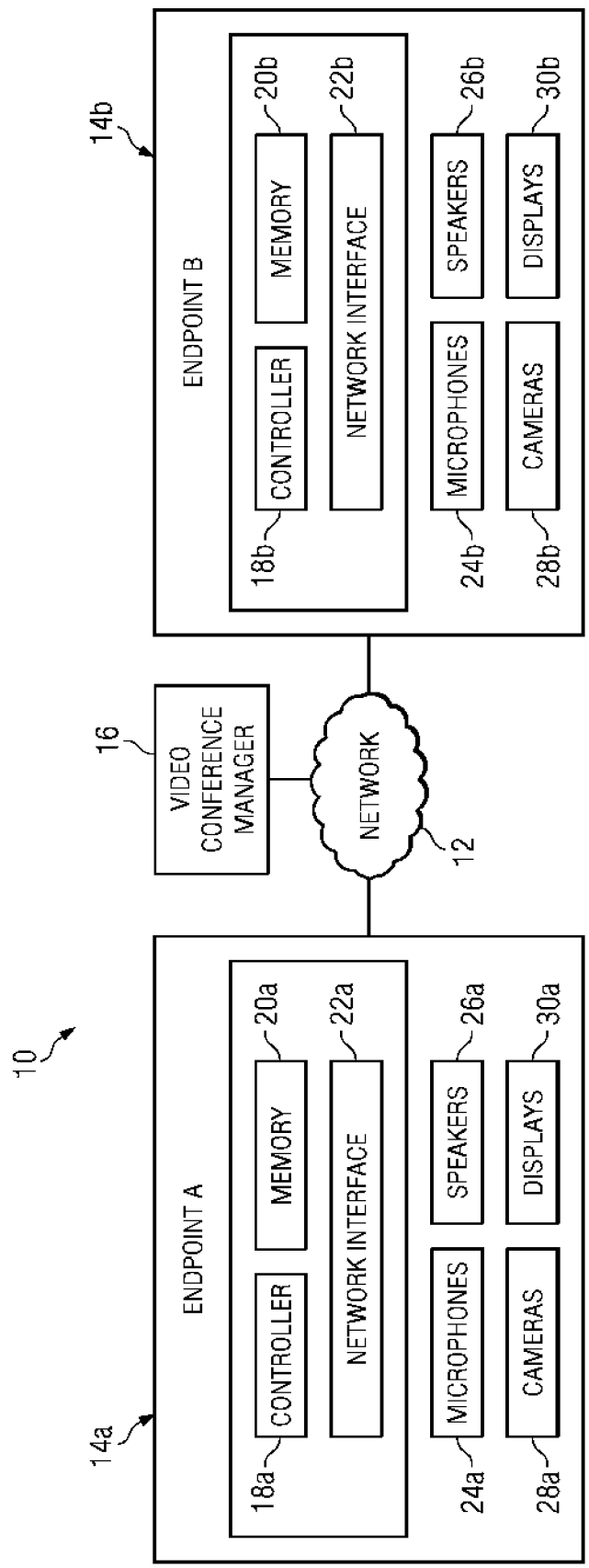
FIG. 1 illustrates a communications system that includes two endpoints engaged in a video conference.

Before the present methods and systems are disclosed and described, it is to be understood that the methods and systems are not limited to specific synthetic methods, specific components, or to particular compositions, as such may, of course, vary. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Exemplary" as used herein means "an example of" and is not meant to convey a sense of an ideal or preferred embodiment.

"Optional" or "optionally" means that the subsequently described event or circumstance may or may not occur, and that the description includes instances where said event or circumstance occurs and instances where it does not.

The present methods and systems may be understood more readily by reference to the following detailed description of preferred embodiments and the Examples included therein and to the Figures and their previous and following description.

In particular embodiments, systems and methods for providing configuration options for points in a multi-point videoconference system comprise determining first configuration information for a first point of a multi-point videoconferencing system. Second configuration information is determined for a second point of the multi-point videoconferencing system. Call configuration or endpoint configuration of one or more endpoints of the multi-point teleconferencing system are reconfigured based upon the first configuration information or the second configuration information. For instance, one or more first cameras at the first point or one or more second cameras at the second point of the multi-point videoconferencing system can be reconfigured based on the first configuration information or the second configuration information. In other instances constraints are imposed on video streams to and from one or more of the endpoints. The method can be implemented using one or more processors that can comprise endpoint equipment or a video conference manager. Endpoint configuration information can include detection of the presence of participants at an endpoint, the positions of the participants (whether occupied or unoccupied), and whether a camera is directed at an occupied or unoccupied position. Call configuration can comprise the number of video streams to and from a particular endpoint as well as the view data that comprises a video stream. Reconfiguration can involve moving the point at which a camera is aimed to obtain better participant gaze properties, switching on or off fixed cameras, etc. or selection of particular video streams.

FIG. 1 illustrates a communications system, indicated generally at 10, that includes two endpoints engaged in a video conference. As illustrated, communications system 10 includes network 12 connecting endpoints 14 and a videoconference manager 16. In some instances the videoconference manager can comprise the multi-point control unit (MCU). While not illustrated, communications system 10 may also include any other suitable elements to facilitate video conferences.

In general, during a video conference, a display at a local endpoint 14 is configured to concurrently display multiple video streams of a remote endpoint 14. These video streams may each include an image of the remote endpoint 14 as seen from different angles or perspectives. In some instances, positions at the local endpoints can be unoccupied or the camera angle may not be optimized for participants in occupied positions. By reconfiguring cameras at a local endpoint or selecting only certain video streams, images of empty positions can be prevented and participant gaze can be improved, which may result in a more realistic video conferencing experience.

Network 12 interconnects the elements of communications system 10 and facilitates video conferences between endpoints 14 in communications system 10. While not illustrated, network 12 may include any suitable devices to facilitate communications between endpoints 14, videoconference manager 16, and other elements in communications system 10 such as, for example, a MCU. Network 12 represents communication equipment including hardware and any appropriate controlling logic for interconnecting elements coupled to or within network 12. Network 12 may include a local area network (LAN), metropolitan area network (MAN), a wide area network (WAN), any other public or private network, a local, regional, or global communication network, an enterprise intranet, other suitable wireline or wireless communication link, or any combination of any suitable network. Network 12 may include any combination of gateways, routers, hubs, switches, access points, base stations, and any other hardware or software implementing suitable protocols and communications.

Endpoints 14 represent telecommunications equipment that supports participation in video conferences. A user of communications system 10 may employ one of endpoints 14 in order to participate in a video conference with another one of endpoints 14 or another device in communications system 10. In particular embodiments, endpoints 14 are deployed in conference rooms at geographically remote locations. Endpoints 14 may be used during a video conference to provide participants with a seamless video conferencing experience that aims to approximate a face-to-face meeting. Each endpoint 14 may be designed to transmit and receive any suitable number of audio and/or video streams conveying the sounds and/or images of participants at that endpoint 14. Endpoints 14 in communications system 10 may generate any suitable number of audio, video, and/or data streams and receive any suitable number of streams from other endpoints 14 participating in a video conference. Moreover, endpoints 14 may include any suitable components and devices to establish and facilitate a video conference using any suitable protocol techniques or methods. For example, Session Initiation Protocol (SIP) or H.323 may be used. Additionally, endpoints 14 may support and be inoperable with other video systems supporting other standards such as H.261, H.263, and/or H.264, as well as with pure audio telephony devices. As illustrated, endpoints 14 include a controller 18, memory 20, network interface 22, microphones 24, speakers 26, cameras 28, and displays 30. Also, while not illustrated, endpoints 14 may include any other suitable video conferencing equipment, for example, a speaker phone, a scanner for transmitting data, and a display for viewing transmitted data.

Controller 18 controls the operation and administration of endpoint 14. Controller 18 may process information and signals received from other elements such as network interface 22, microphones 24, speakers 26, cameras 28, and displays 30. Controller 18 may include any suitable hardware, software, and/or logic. For example, controller 18 may be a programmable logic device, a microcontroller, a microprocessor, a processor, any suitable processing device, or any combination of the preceding. Memory 20 may store any data or logic used by controller 18 in providing video conference functionality. In some embodiments, memory 20 may store all, some, or no data received by elements within its corresponding endpoint 14 and data received from remote endpoints 14. Memory 20 may include any form of volatile or non-volatile memory including, without limitation, magnetic media, optical media, random access memory (RAM), read-only memory (ROM), removable media, or any other suitable local or remote memory component. Network interface 22 may communicate information and signals to and receive information and signals from network 12. Network interface 22 represents any port or connection, real or virtual, including any suitable hardware and/or software that allow endpoint 14 to exchange information and signals with network 12, other endpoints 14, videoconference manager 16, and/or any other devices in communications system 10.

Microphones 24 and speakers 26 generate and project audio streams during a video conference. Microphones 24 provide for audio input from users participating in the video conference. Microphones 24 may generate audio streams from received sound waves. Speakers 26 may include any suitable hardware and/or software to facilitate receiving audio stream(s) and projecting the received audio stream(s) so that they can be heard by the local participants. For example, speakers 26 may include high-fidelity speakers. Endpoint 14 may contain any suitable number of microphones 24 and speakers 26, and they may each be associated with any suitable number of participants.

Cameras 28 and displays 30 generate and project video streams during a video conference. Cameras 28 may include any suitable hardware and/or software to facilitate capturing an image of one or more local participants and the surrounding area as well as sending the image to remote participants. Each video signal may be transmitted as a separate video stream (e.g., each camera 28 transmits its own video stream). In particular embodiments, cameras 28 capture and transmit the image of one or more users 30 as a high-definition video signal. Further it is contemplated that cameras are described herein are not limited to physical cameras. For instance, some teleconferencing systems can generate multiple viewpoints from locations where no camera physically resides. The field of computer graphics comprising image based rendering, as known to one of ordinary skill in the art, teaches the synthesis of new views through the manipulation of the data from a collection of (physical) cameras in other locations. Displays 30 may include any suitable hardware and/or software to facilitate receiving video stream(s) and displaying the received video streams to participants. For example, displays 30 may include a notebook PC, a wall mounted monitor, a floor mounted monitor, or a free standing monitor. In particular embodiments, one or more of displays 30 are plasma display devices or liquid crystal display devices. Endpoint 14 may contain any suitable number of cameras 28 and displays 30, and they may each be associated with any suitable number of local participants.

While each endpoint 14 is depicted as a single element containing a particular configuration and arrangement of modules, it should be noted that this is a logical depiction, and the constituent components and their functionality may be performed by any suitable number, type, and configuration of devices. In the illustrated embodiment, communications system 10 includes two endpoints 14a, 14b, but it is to be understood that communications system 10 may include any suitable number of endpoints 14.

Videoconference manager 16 generally coordinates the initiation, maintenance, and termination of video conferences between endpoints 14. Video conference manager 16 may obtain information regarding scheduled video conferences and may reserve devices in network 12 for each of those conferences. In addition to reserving devices or resources prior to initiation of a video conference, videoconference manager may monitor the progress of the video conference and may modify reservations as appropriate. Also, video conference manager 16 may be responsible for freeing resources after a video conference is terminated. Although video conference manager 16 has been illustrated and described as a single device connected to network 12, it is to be understood that its functionality may be implemented by any suitable number of devices located at one or more locations in communication system 10.

In an example operation, one of endpoints 14a, 14b initiates a video conference with the other of endpoints 14a, 14b. The initiating endpoint 14 may send a message to video conference manager 16 that includes details specifying the time of, endpoints 14 to participate in, and estimated duration of the desired video conference. Video conference manager 16 may then reserve resources in network 12 and may facilitate the signaling required to initiate the video conference between endpoint 14a and endpoint 14b. During the video conference, endpoints 14a, 14b may exchange one or more audio streams, one or more video streams, and one or more data streams. In particular embodiments, endpoint 14a may send and receive the same number of video streams as endpoint 14b. In certain embodiments, each of endpoints 14a, 14b send and receive the same number of audio streams and video streams. In some embodiments, endpoints 14a, 14b send and receive more video streams than audio streams. Video streams can be automatically controlled in regard to their routing as well as which streams are transmitted and/or received by the endpoints by the MCU component of the video conference manager 16.

During the video conference, each endpoint 14a, 14b may generate and transmit multiple video streams that provide different perspective-dependent views to the other endpoint 14a, 14b. For example, endpoint 14a may generate three video streams that each provide a perspective-dependent view of participants at endpoint 14a. These may show the participants at endpoint 14a from three different angles, e.g., left, center, and right. After receiving these video streams, endpoint 14b may concurrently display these three video streams on a display so that participants situated to the left of the display view one of the video streams, while participants situated directly in front of the display view a second of the video streams. Likewise, participants situated to the right of the display may view the third of the video streams. Accordingly, endpoint 14b may display different perspective-dependent views of remote participants to local participants. By providing different images to different participants, local participants may be able to more easily interpret the meaning of certain nonverbal clues (e.g., eye gaze, pointing) while looking at a two-dimensional image of a remote participant. The video streams sent from one endpoint to one or more other endpoints can be reconfigured to provide better eye-gaze during a videoconference. For instance, in one example a multi-stream endpoint may be used by a single person, or several. In a first configuration, the endpoint resources can be used to send multiple views of the single person, from different angles, (over the network) to the other endpoints. In a second configuration, the endpoint can be configured to send streams in which different people are shown in each stream. Therefore, in one embodiment the camera viewpoints are configured at an endpoint depending on the number of people at that endpoint. For a second example, four multi-stream endpoints may be connected in a multipoint call. From the point of view of one endpoint A, the three display screens in room A may be used in two ways. In one configuration, there is only one person in each of the other three endpoints, so each of those would be shown on a different display. In a second configuration, there are multiple people in each of the other locations, and several streams of video will be sent from each of those endpoints. In that case it would be preferable to show all the streams from one endpoint at once, using all the display space at endpoint A to show all the streams from endpoint B. Thus, an endpoint (and a call) can be reconfigured depending on the number of people at other endpoints.

When the participants decide that the video conference should be terminated, endpoint 14a or endpoint 14b may send a message to video conference manager 16, who may then un-reserve the reserved resources in network 12 and facilitate signaling to terminate the video conference. While this video conference has been described as occurring between two endpoints—endpoint 14a and endpoint 14b—it is to be understood that any suitable number of endpoints 14 at any suitable locations may be involved in a video conference.

An example of a communications system with generally two endpoints engaged in a video conference has been described. This example is provided to explain a particular embodiment and is not intended to be all inclusive. While system 10 is depicted as containing a certain configuration and arrangement of elements, it should be noted that this is simply a logical depiction, and the components and functionality of system 10 may be combined, separated and distributed as appropriate both logically and physically. Also, the functionality of system 10 may be provided by any suitable collection and arrangement of components.

Figure 2A:
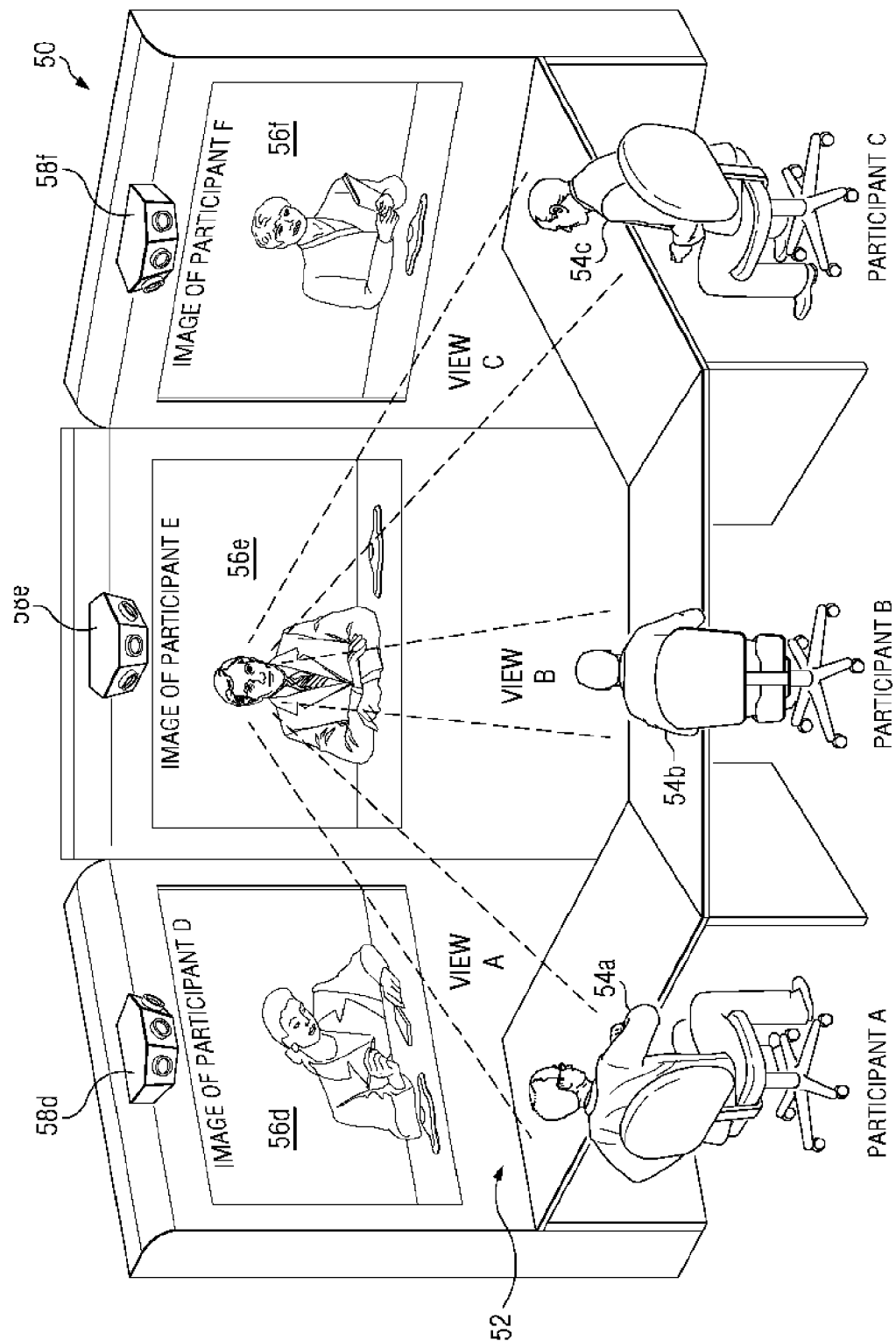
FIGS. 2a-2b illustrate endpoints that use cameras and multiple view display devices to concurrently provide local participants with perspective-dependent views of remote participants.
Figure 2B:
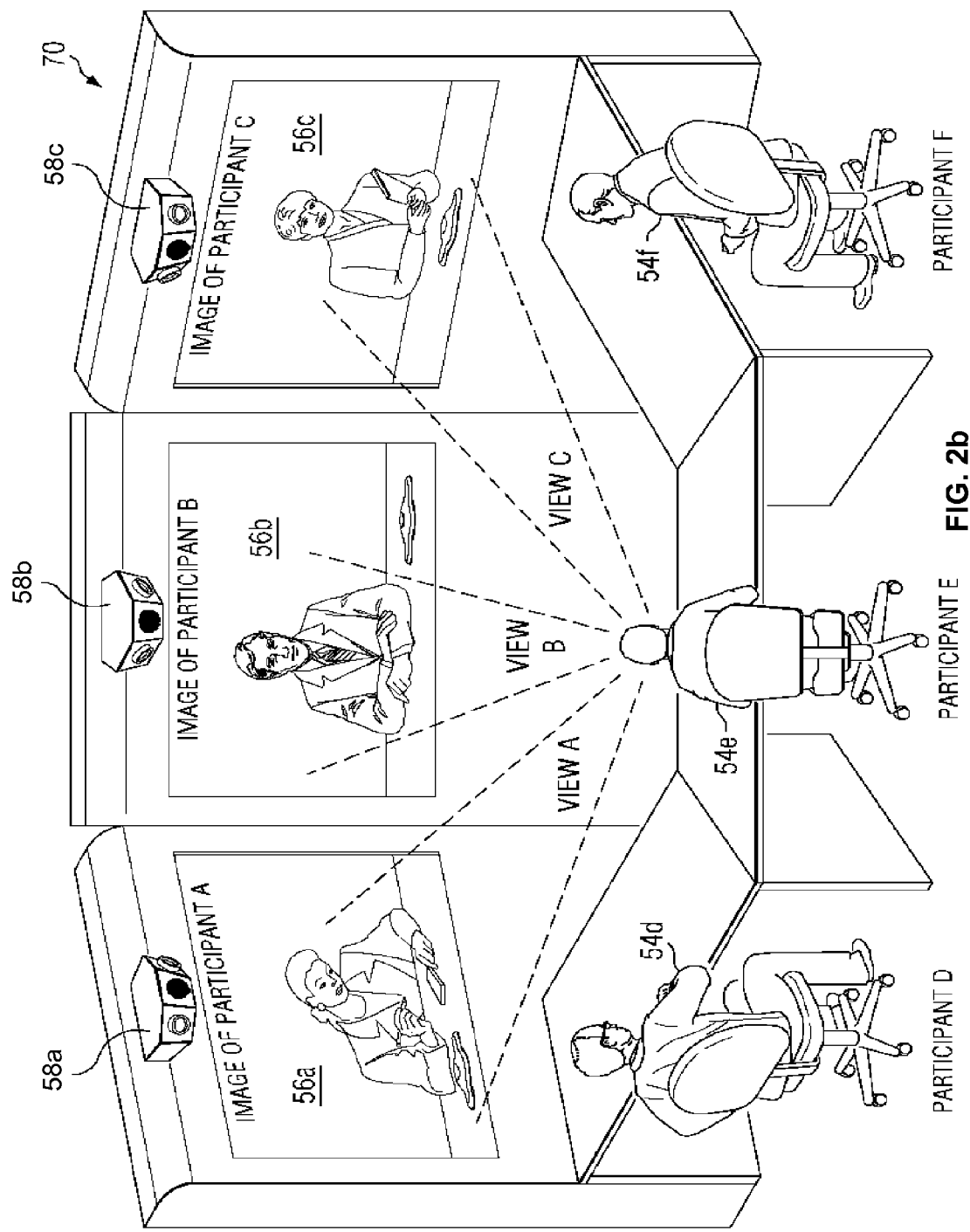

FIGS. 2a-2b illustrate endpoints, indicated generally at 50 and 70, that use cameras and multiple view display devices to concurrently provide local participants with perspective-dependent views of remote participants. As used throughout this disclosure, "local" and "remote" are used as relational terms to identify, from the perspective of a "local" endpoint, the interactions between and operations and functionality within multiple different endpoints participating in a video conference. Accordingly, the terms "local" and "remote" may be switched when the perspective is that of the other endpoint.

FIG. 2a illustrates an example of a setup that may be provided at endpoint 50. In particular embodiments, endpoint 50 is one of endpoints 14. As illustrated, endpoint 50 includes a table 52, three participants 54, three displays 56, and three camera clusters 58. While not illustrated, endpoint 50 may also include any suitable number of microphones, speakers, data input devices, data output devices, and/or any other suitable equipment to be used during or in conjunction with a video conference.

As illustrated, participants 54a, 54b, 54c are positioned around one side of table 52. On the other side of table 52 sits three displays 56d, 56e, 56f, and one of camera clusters 58d, 58e, 58f is positioned above each display 56d, 56e, 56f. In the illustrated embodiment, each camera cluster 58 contains three cameras, with one camera pointed in the direction of each of the local participants 54a, 54b, 54c. While endpoint 50 is shown having this particular configuration, it is to be understood that any suitable configuration may be employed at endpoint 50 in order to facilitate a desired video conference between participants at endpoint 50 and participants at a remote endpoint 14. As an example, camera clusters 58 may be positioned below or behind displays 56. Additionally, endpoint 50 may include any suitable number of participants 54, displays 56, and camera clusters 58.

In the illustrated embodiment, each display 56d, 56e, 56f shows one of the remote participants 54d, 54e, 54f. Display 56d shows the image of remote participant 54d; display 56e shows the image of remote participant 54e; and display 56f shows the image of remote participant 54f. These remote participants may be participating in the video conference through a remote endpoint 70, as is described below with respect to FIG. 2B. Using traditional methods, each local participant 54a, 54b, 54c would see the same image of each remote participant 54. For example, when three different individuals look at a traditional television screen or computer monitor, each individual sees the same two-dimensional image as the other two individuals. However, when multiple individuals see the same image, they may be unable to distinguish perspective-dependent non-verbal clues provided by the image. For example, remote participant 54 may point at one of the three local participants 54a, 54b, 54c to indicate to whom he is speaking. If the three local participants 54a, 54b, 54c view the same two-dimensional image of the remote participant 54, it may be difficult to determine which of the local participants 54 has been selected by the remote participant 54 because the local participants 54 would not easily understand the non-verbal clue provided by the remote participant 54.

However, displays 56 are configured to provide multiple perspective-dependent views to local participants 54. As an example, consider display 56e, which shows an image of remote participant 54e. In the illustrated embodiment, display 56e concurrently displays three different perspective-dependent views of remote participant 54e. Local participant 54a sees view A; local participant 54b sees view B; and participant 54c sees view C. Views A, B, and C all show different perspective-dependent views of remote participant 54e. View A may show an image of remote participant 54e from the left of remote participant 54e. Likewise, views B and C may show an image of remote participant 54e from the center and right, respectively, of remote participant 54e. In particular embodiments, view A shows the image of remote participant 54e that would be seen from a camera placed substantially near the image of local participant 54a that is presented to remote participant 54e. Accordingly, when remote participant 54e looks at the displayed image of local participant 54a, it appears (to local participant 54a) as if remote participant 54e were looking directly at local participant 54a. Concurrently, and by similar techniques, views B and C (shown to participants 54b and 54c, respectively) may see an image of remote participant 54e that indicated that remote participant 54e was looking at local participant 54a.

Camera clusters 58 generate video streams conveying the image of local participants 54a, 54b, 54c for transmission to remote participants 54d, 54e, 54f. These video streams may be generated in a substantially similar way as is described below in FIG. 2b with respect to remote endpoint 70. Moreover, the video streams may be displayed by remote displays 58 in a substantially similar way to that previously described for local displays 56d, 56e, 56f.

FIG. 2b illustrates an example of a setup that may be provided at the remote endpoint described above, indicated generally at 70. In particular embodiments, endpoint 70 is one of endpoints 14a, 14b in communication system 10. As illustrated, endpoint 70 includes a table 72, participants 54d, 54e, and 54f, displays 56, and camera clusters 58.

In the illustrated embodiment, three participants 54d, 54e, 54f local to endpoint 70 sit on one side of table 72 while three displays 56a, 56b, and 56c are positioned on the other side of table 72. Each display 56a, 56b, and 56c shows an image of a corresponding participant 54 remote to endpoint 70. These displays 56a, 56b, and 56c may be substantially similar to displays 56d, 56e, 56f at endpoint 50. These displayed participants may be the participants 54a, 54b, 54c described above as participating in a video conference through endpoint 50. Above each display 56 is positioned a corresponding camera cluster 58. While endpoint 70 is shown having this particular configuration, it is to be understood that any suitable configuration may be employed at endpoint 70 in order to facilitate a desired video conference between participants at endpoint 70 and a remote endpoint 14 (which, in the illustrated embodiment, is endpoint 50). As an example, camera clusters 58 may be positioned below or behind displays 56. Additionally, endpoint 70 may include any suitable number of participants 54, displays 56, and camera clusters 58.

As illustrated, each camera cluster 58a, 58b, 58c includes three cameras that are each able to generate a video stream. Accordingly, with the illustrated configuration, endpoint 70 includes nine cameras. In particular embodiments, fewer cameras are used and certain video streams or portions of a video stream are synthesized using a mathematical model. In other embodiments, more cameras are used to create multiple three dimensional images of participants 54. In some embodiments, the cameras in camera clusters 58 are cameras 28. In some instances, single cameras can be used. In some instances the single cameras are moveable and can be remotely controlled.

In one embodiment each camera cluster 58, one camera is positioned to capture the image of one of the local participants 54d, 54e, 54f. Accordingly, each local participant 54d, 54e, 54f has three cameras, one from each camera cluster 58, directed towards him or her. For example, three different video streams containing an image of participant 54e may be generated by the middle camera in camera cluster 58a, the middle camera in camera cluster 58b, and the middle camera in camera cluster 58c, as is illustrated by the shaded cameras. The three cameras corresponding to local participant 54e will each generate an image of participant 54e from a different angle. Likewise, three video streams may be created to include different perspectives of participant 54d, and three video streams may be created to include different perspectives of participant 54f. However, it may be desirable to have a video stream from only one camera (e.g. turning off camera clusters 58d and 58e when imaging participant 54e), not image positions at the endpoint that are not occupied, or to optimize the direction and angle of any of the cameras to facilitate be able to more easily interpret non-verbal cues, such as eye gaze and pointing.

Particular embodiments of endpoints 50, 70 and their constituent components have been described and are not intended to be all inclusive. While these endpoints 50, 70 are depicted as containing a certain configuration and arrangement of elements, components, devices, etc., it should be noted that this is simply an example, and the components and functionality of each endpoint 50, 70 may be combined, separated and distributed as appropriate both logically and physically. In particular embodiments, endpoint 50 and endpoint 70 have substantially similar configurations and include substantially similar functionality. In other embodiments, each of endpoints 50, 70 may include any suitable configuration, which may be the same as, different than, or similar to the configuration of another endpoint participating in a video conference. Moreover, while endpoints 50, 70 are described as each including three participants 54, three displays 56, and three camera clusters 58, endpoints 50, 70 may include any suitable number of participant 54, displays 56, and cameras or camera clusters 58. In addition, the number of participant 54, displays 56, and/or camera clusters 58 may differ from the number of one or more of the other described aspects of endpoint 50, 70. Any suitable number of video streams may be generated to convey the image of participants 54 during a video conference.

As shown in reference to FIGS. 2a and 2b, in a video conference room with multiple chairs (i.e., multiple positions), human presence can be detected by using multiple video cameras pointed at the chairs. Based on the number of people in each room in each endpoint of the conference, embodiments of the videoconferencing system can configure conference geometry by selecting from a plurality of cameras pointed at the participants from different angles. This can result in a more natural eye-gaze between conference members.

Presence Detection

In one aspect, human presence (i.e., presence detection) can be accomplished using face detection algorithms and technology. Face detection is performed on the video signal from cameras which cover all the possible seating positions in the room. Face detection, in one embodiment, van be performed on an input to the video encoder as a HD resolution picture captured in a video conferencing system. The video encoder can be comprised of one or more processors, each of which processes and encodes one row of macroblocks of the picture. For each 16×16 macroblock (MB), the one or more processors perform pre-processing e.g. color space conversion, edge detection, edge thinning, color segmentation, and feature summarization, before coding the block. At the end, the one or more processors transfer two results to a base processor: the total number of original edge features in the MB and the total number of thinned, color-segmented edge features in the MB. The base processor collects the results for all the MBs and performs fast detection of face regions, while the one or more processors can proceed with general video coding tasks including motion estimation, motion compensation, and block transform. With feedback from the base processor, the one or more processors then encode the transform coefficients of the MBs based on the face detection result, following a pre-defined scheme to assign coding parameters such as quantization step size.

The raw face detection is refined by tracking and hysteresis to produce high-confidence data on how many people are in the room and which chairs (i.e., positions) they are in.

Other methods of presence detection can also be employed in embodiments according to the present invention such as motion detection, chair sensors, or presence monitoring with RFID or ID badges, which require external infrastructure and personal encumbrance.

Camera and Conference Configuration

Videoconference endpoints 14 can be configured in various ways. For instance, in one aspect the videoconference endpoint is comprised of a plurality of large video displays that can be mounted end to end, on one side of a room, with a slight inward tilt to the outer two (see FIGS. 2a and 2b). Nominally, a three video display system (the "triple") is configured to allow six people to participate, with cameras pointed at pairs accordingly. Other configurations can have only one video display.

Figure 3:
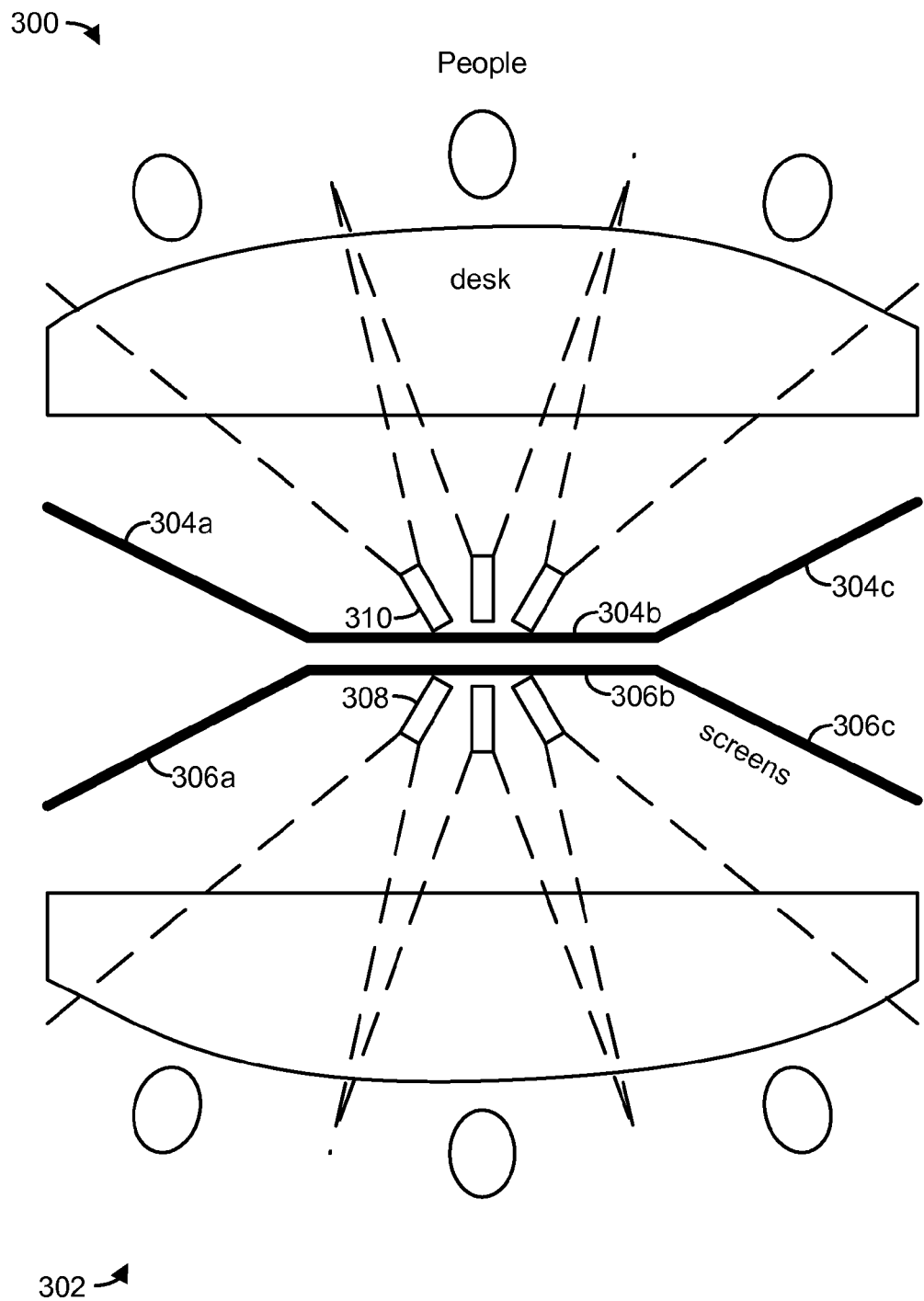
FIG. 3 is an exemplary illustration of a multi-point videoconferencing system having two endpoints showing two triples talking to each other, which can be referred to as a 2×3 conference.

In multi-point conferences, there can be various combinations of singles talking to triples. For instance, FIG. 3 is an exemplary illustration of a multi-point videoconferencing system having two endpoints 300, 302 showing two triples talking to each other, which can be referred to as a 2×3 conference. Each video display 304, 306 at each endpoint 300, 302 displays video from a corresponding camera 308, 310 in the other endpoint.

In order to preserve an illusion of a single room divided by a sheet of glass, the cameras 308, 310 can placed over the center video display 304b, 306b in each room, allowing the geometry of the room to be preserved. The multiple cameras 308, 310 act as one wide angle camera. Each participant is picked up by one and only one camera depending upon the position occupied by the participant. In such a system, video cameras can be turned off or on to capture images of people at positions or to prevent showing empty positions. Occupied positions can be detected using, for example, the presence detection technology described above, and cameras and/or video streams can be controlled depending upon the detection of a person at a position or the detection of an occupied position. Likewise, video streams can be controlled such that participants at one endpoint see, for example, three views of one person or a view of each participant at the other endpoint in one of the displays (e.g., 340a, 340b or 340c).

Figure 4:
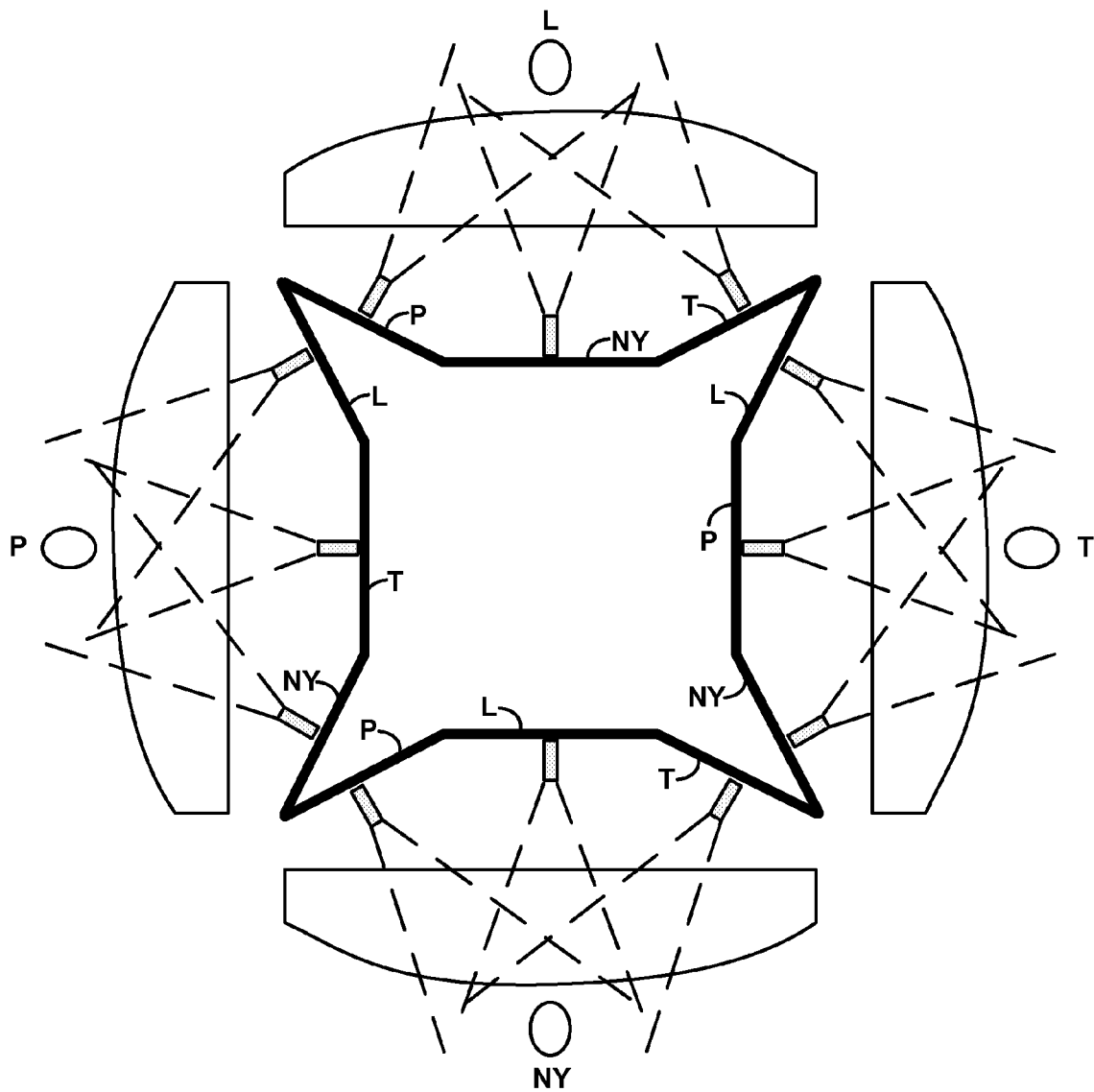
FIGS. 4 and 5 show multipoint conferences occurring between four people in different locations, which can be referred to as a 4×1 conference.
Figure 5:
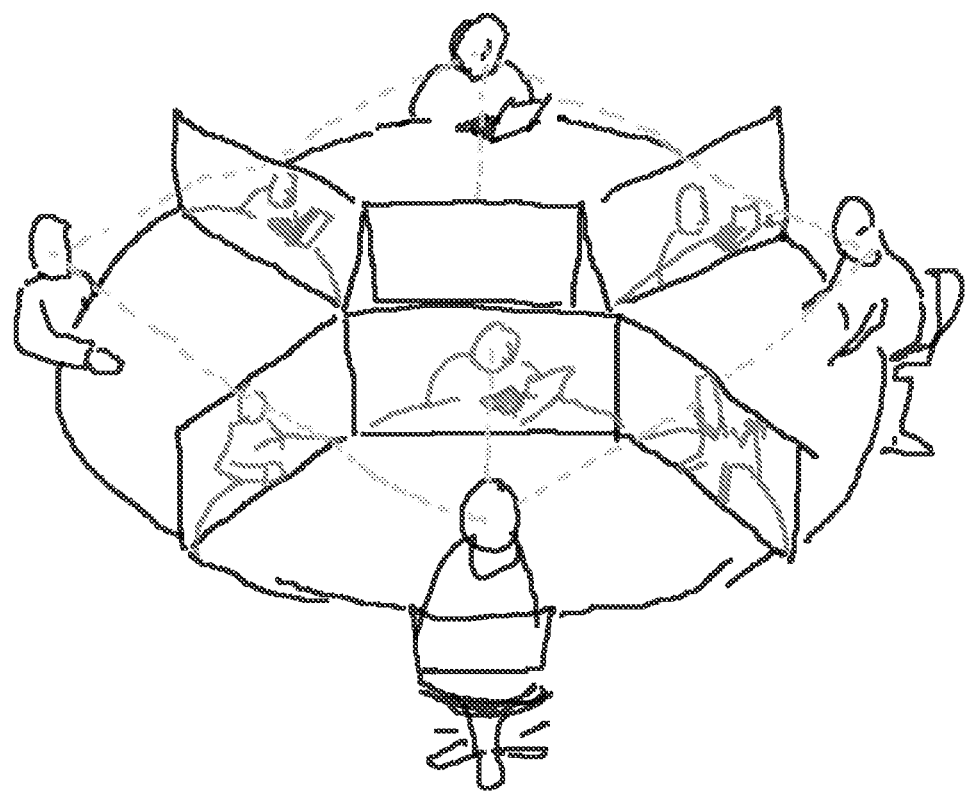

FIGS. 4 and 5 show multipoint conferences occurring between four people in different locations, which can be referred to as a 4×1 conference. This situation is sometimes depicted with location tags on each screen such as, for example, Paris, London, New York and Tokyo (P, L, T, NY). A participant in Paris would see London, New York, Tokyo; a participant in London would see Paris, New York and Tokyo; etc. To create and maintain the illusion that these four people are seated at one large round table, then if Paris can see London on his left, then London should see Paris on his right; cameras should be located over each of the three screens, all pointed towards the solo person at the desk; the signal from the left camera should be sent to the endpoint that is shown on a left screen, etc. That is, the camera over the Paris screen in any of the three endpoints other than Paris is the camera that is providing the video signal from the present endpoint (London, New York or Tokyo) to the Paris endpoint.

Automatic Configuration

Embodiments according to the present invention involve configuration selection for a videoconference session. Embodiments according to the present invention provide a videoconferencing system and method of video conferencing comprised of multiple cameras or servo-movable cameras. When a videoconference is initiated, the number of participants at each location is detected, and that that information is used to create a conference configuration map. The participant configuration information is used to suggest or enact a reconfiguration of camera locations at each endpoint or to control video streams to and from endpoints. For instance, in one instance it may be desired to automatically detect the number of participants at a point and shut-down the flanking cameras that are pointed at empty chairs. In one embodiment, the cameras can be motorized to pan and to move sideways on tracks. In one embodiment, multiple fixed cameras are available and the system switches between them to provide images of only the occupied positions at that point. In one embodiment the system detects the opportunity for re-configuration but prompts the user to manually initiate re-configuration by, for example, a mouse-click, depressing a button, automatic voice recognition, touch-screen, etc. In one embodiment different endpoints have different numbers of screens.

Figure 6:
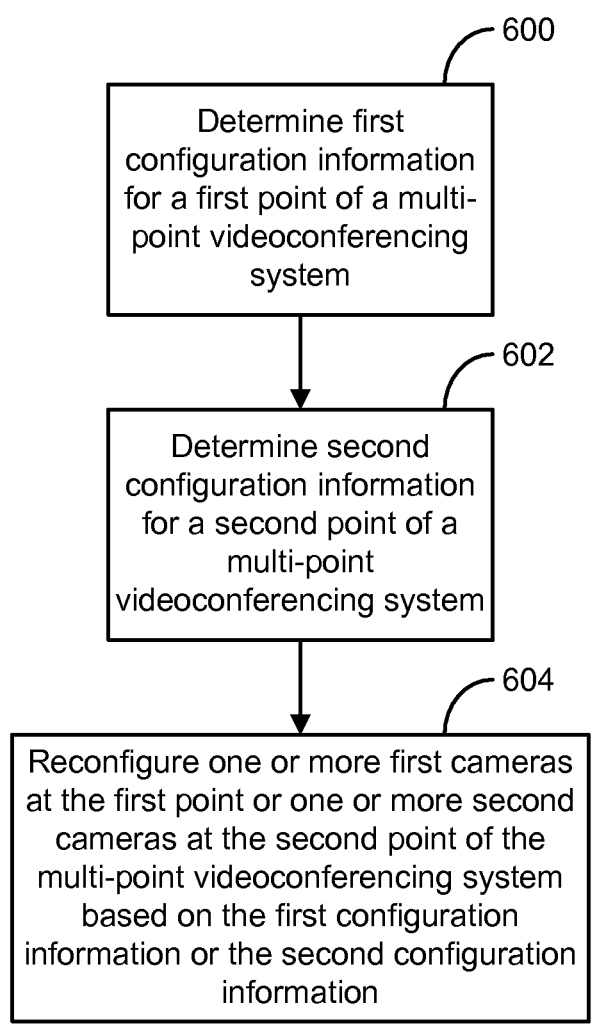
FIG. 6 is an exemplary flowchart of FIG. 6 showing a for re-configuration of at least one point of a multi-point videoconferencing system.

As shown in the exemplary flowchart of FIG. 6, a method is provided for re-configuration of at least one point of a multi-point videoconferencing system. The process comprises determining first configuration information for a first point of a multi-point videoconferencing system at step 600. This can comprise, for example, detecting a number of first positions at the first endpoint, a current camera position for each of one or more first cameras at the first endpoint, the number of people and occupied positions at the endpoint, the video streams to and from the endpoint, etc.

At step 602, second configuration information for a second point of the multi-point videoconferencing system is determined. This can comprise, for example, detecting a number of second positions at the second endpoint, a current camera position for each of one or more second cameras at the second endpoint, the number of people and occupied positions at the endpoint, the video streams to and from the endpoint, etc.

At step 604, one or more first cameras at the first point or one or more second cameras at the second endpoint of the multi-point videoconferencing system are reconfigured based on the first configuration information or the second configuration information. Reconfiguring the first or second endpoint can comprise in one embodiment according to the present invention, detecting a number of participants at the endpoint under consideration (whether the first point or the second point), determining whether each of the number of positions at the endpoint under consideration is occupied by a participant, and disabling one or more cameras at the endpoint under consideration that are substantially directed toward empty positions. In another embodiment, the endpoint under consideration can be reconfigured by detecting a number of participants at the endpoint, determining whether each of the number of positions at the endpoint is occupied by a participant, and mechanically reorienting one or more cameras at the endpoint from their current camera position such that they are substantially directed toward occupied positions. In one aspect, the cameras are reoriented from their current position to a new position directed toward occupied positions using motorized cameras, as are known in the art. For instance, the motorized cameras can be track-mounted having servo-moveable operation and have motor operable pan and track movement features. In yet another embodiment, cameras at the endpoint under consideration can be reconfigured by detecting a number of participants at the endpoint, determining whether each of the number of positions at the endpoint is occupied by a participant, and switching between a plurality of fixed cameras that comprise the one or more cameras at the endpoint such that one or more of the plurality of fixed cameras are substantially directed toward occupied positions. In one aspect, a proposed reconfiguration of the cameras at the first endpoint or the second endpoint can be proposed to a conference user, and the reconfiguration can be performed subsequent to user initiation of the reconfiguration. In other aspects, reconfiguration can be automatically performed by the videoconference system. The system can be configured such that a user can selectively choose automatic reconfiguration or user-initiated reconfiguration. Similarly, video streams to and from endpoints in the multi-point conferencing system can be controlled such that views displayed and transmitted by an endpoint facilitate the videoconference and network bandwidth is not exceeded.

It is to be appreciated that although only two points of a multi-point videoconferencing system is described in the process of FIG. 6, it is contemplated within the scope of the invention that the same process can be applied to a plurality of points greater than two.

Figure 7:
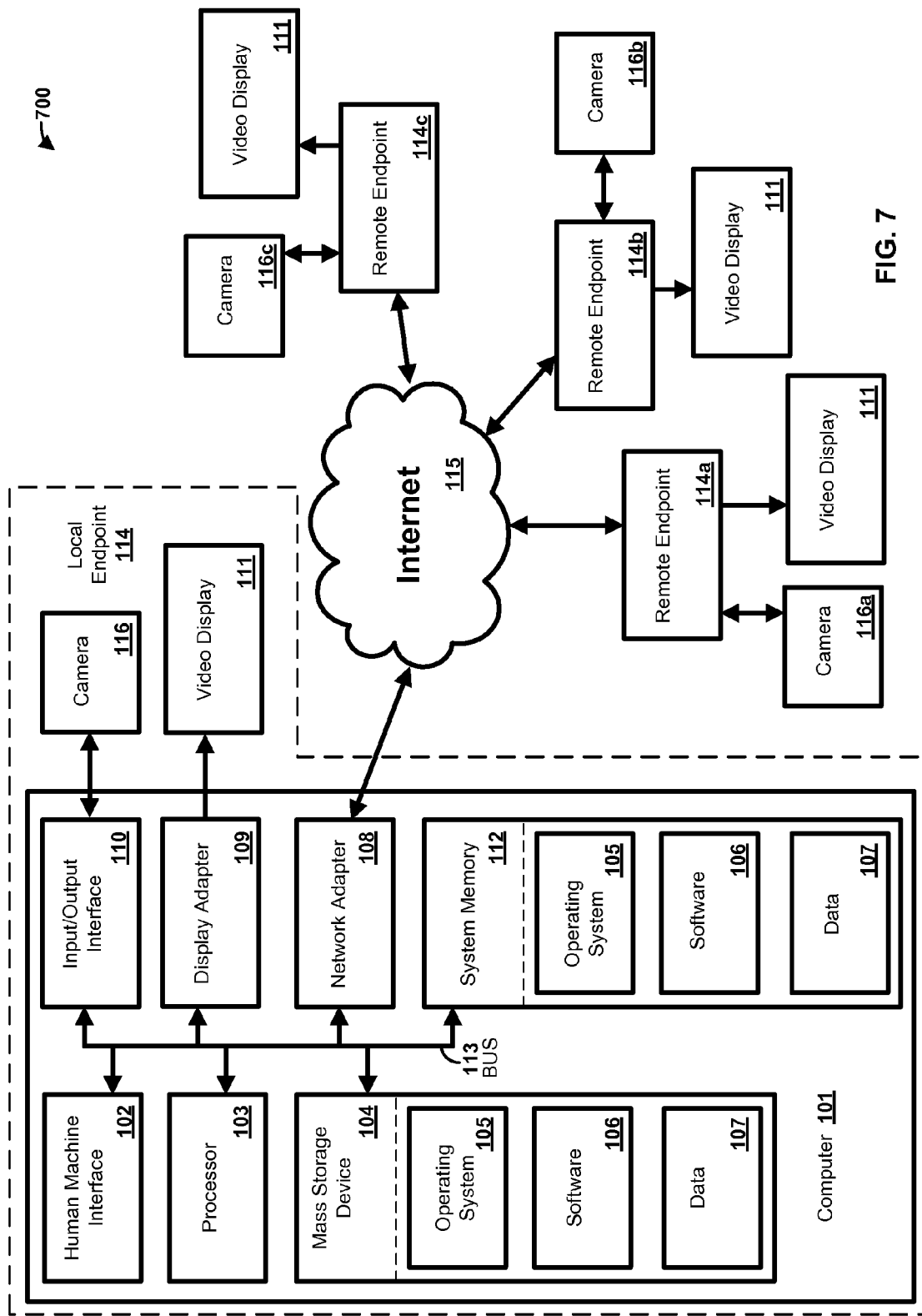
FIG. 7 is an illustration of an embodiment of a multi-point videoconferencing system 700.

FIG. 7 is an illustration of an embodiment of a multi-point videoconferencing system 700. The illustrated embodiment is comprised of a typical local endpoint 114, shown in detail, and a plurality of remote endpoints 114. As shown, each endpoint 114 is comprised of one or more cameras 116 and one or more video displays 111. At each endpoint are one or more positions, which can be, for example, chairs for the videoconference participants to sit. Further comprising the video conferencing system is at least one computing device 101 comprising at least a control, microprocessor or processor 103. Executable on the processor is videoconferencing software 106, which can include, for example, software for presence detection such as face recognition software, software for analyzing and controlling video streams between endpoints, etc. Parts or all of the executable software code can be stored in a memory 112, 104 of the computing device 101. In various embodiments, each endpoint 114 has a separate computing device 101, or one or more endpoints 114 can share one or more computing devices 101. Further comprising the videoconferencing software 106, in an embodiment according to the present invention, is software for determining the configuration of an endpoint 114. This may be as simple as the presence detection software determining that the camera 116 is directed toward a position occupied by a participant. It could also include feedback from the camera 116 indicating the position and angle of the camera relative to a position. The scope of the invention is contemplate to encompass various methods and systems for determining the configuration of an endpoint 114, including manual entry of endpoint information by a user into a human-machine interface 102.

Configuration information, once determined, is used by an embodiment of the videoconference software 106 to determine whether the cameras at endpoint 114 should be reconfigured to better facilitate the videoconference. Reconfiguration can include either suggesting or implementing movement of one or more cameras 116, switching one or more cameras 116 on or off, or suggesting relocation of participants into different positions. As indicated above, reconfiguration can be implemented automatically (using for example, motorized cameras), or can be provided as a suggestion to participants and users of the system.

The system has been described above as comprised of units. One skilled in the art will appreciate that this is a functional description and that the respective functions can be performed by software, hardware, or a combination of software and hardware. A unit can be software, hardware, or a combination of software and hardware. The units can comprise the videoconference software 106 as illustrated in FIG. 7 and described below. In one exemplary aspect, the units can comprise a computer 101 as illustrated in FIG. 7 and described below.

FIG. 7 is a block diagram illustrating an exemplary operating environment for performing the disclosed method. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the system and method comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed system and method can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed method can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the system and method disclosed herein can be implemented via a general-purpose computing device in the form of a computer 101. The components of the computer 101 can comprise, but are not limited to, one or more processors or processing units 103, a system memory 112, and a system bus 113 that couples various system components including the processor 103 to the system memory 112. In the case of multiple processing units 103, the system can utilize parallel computing.

The system bus 113 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI) bus also known as a Mezzanine bus. The bus 113, and all buses specified in this description can also be implemented over a wired or wireless network connection and each of the subsystems, including the processor 103, a mass storage device 104, an operating system 105, videoconference software 106, videoconference data 107, which can include configuration information of one or more endpoints 114, a network adapter 108, system memory 112, an input/output interface 110, a display adapter 109, a display device 111, and a human machine interface 102, can be contained within one or more remote endpoints 114a,b,c at physically separate locations, connected through buses of this form, in effect implementing a fully distributed system.

The computer 101 typically comprises a variety of computer readable media. Exemplary readable media can be any available media that is accessible by the computer 101 and comprises, for example and not meant to be limiting, both volatile and non-volatile media, removable and non-removable media. The system memory 112 comprises computer readable media in the form of volatile memory, such as random access memory (RAM), and/or non-volatile memory, such as read only memory (ROM). The system memory 112 typically contains data such as videoconference data 107 and/or program modules such as operating system 105 and videoconference software 106 that are immediately accessible to and/or are presently operated on by the processing unit 103.

In another aspect, the computer 101 can also comprise other removable/non-removable, volatile/non-volatile computer storage media. By way of example, FIG. 7 illustrates a mass storage device 104 which can provide non-volatile storage of computer code, computer readable instructions, data structures, program modules, and other data for the computer 101. For example and not meant to be limiting, a mass storage device 104 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 104, including by way of example, an operating system 105 and videoconference software 106. Each of the operating system 105 and videoconference software 106 (or some combination thereof) can comprise elements of the programming and the videoconference software 106. Videoconference data 107 can also be stored on the mass storage device 104. Videoconference data 107 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 101 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 103 via a human machine interface 102 that is coupled to the system bus 113, but can be connected by other interface and bus structures, such as a parallel port, game port, an IEEE 1394 Port (also known as a Firewire port), a serial port, or a universal serial bus (USB).

In yet another aspect, a display device 111, such as a video display, can also be connected to the system bus 113 via an interface, such as a display adapter 109. It is contemplated that the computer 101 can have more than one display adapter 109 and the computer 101 can have more than one display device 111. For example, a display device can be a monitor, an LCD (Liquid Crystal Display), or a projector. In addition to the display device 111, other output peripheral devices can comprise components such as speakers (not shown) and a printer (not shown) which can be connected to the computer 101 via Input/Output Interface 110.

The computer 101 can operate in a networked environment using logical connections to one or more remote endpoints 114a,b,c. By way of example, a remote computing device at a remote endpoint 114 can be a personal computer, portable computer, a server, a router, a network computer, a peer device or other common network node, and so on. Logical connections between the computer 101 and a remote endpoint 114a,b,c can be made via a local area network (LAN) and a general wide area network (WAN). Such network connections can be through a network adapter 108. A network adapter 108 can be implemented in both wired and wireless environments. Such networking environments are conventional and commonplace in offices, enterprise-wide computer networks, intranets, and the Internet 115.

For purposes of illustration, application programs and other executable program components such as the operating system 105 are illustrated herein as discrete blocks, although it is recognized that such programs and components reside at various times in different storage components of the computing device 101, and are executed by the data processor(s) of the computer. An implementation of videoconference software 106 can be stored on or transmitted across some form of computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any method or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

Throughout this application, various publications are referenced. The disclosures of these publications in their entireties are hereby incorporated by reference into this application in order to more fully describe the state of the art to which the methods and systems pertain.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
  determining a first participant configuration for a first endpoint of a videoconferencing system, wherein the first endpoint includes more than one first endpoint participant and more than one first endpoint display, each first endpoint display includes more than one first endpoint camera to capture multiple views of a first endpoint participant viewing the first endpoint display;
  determining a second participant configuration for a second endpoint of a videoconferencing system, wherein the second endpoint includes more than one second endpoint participant and more than one second endpoint display, each second endpoint display includes more than one second endpoint camera to capture multiple views of a second endpoint participant viewing the second endpoint display, wherein the number of captured multiple views of the second endpoint participant is equal to the number of first endpoint displays; and
  selecting a camera configuration based on the first participant configuration and the second participant configuration.

2. The method of claim 1, wherein determining first participant configuration for the first endpoint of the videoconferencing system comprises detecting a number of participants at the first endpoint and determining a position of the participants, relative to the camera configuration at the first endpoint.

3. The method of claim 1, wherein selecting the camera configuration based on the first participant configuration and the second participant configuration comprises choosing a camera viewpoint from a plurality of possible viewpoints, generating a video stream that captures said camera viewpoint, compressing the video stream for transmission, and transmitting the video stream to at least one other endpoint.

4. The method of claim 3, wherein generating the video stream that captures said camera viewpoint comprises enabling transmission of the video stream from a fixed camera that is located in a position to achieve said camera viewpoint.

5. The method of claim 3, wherein generating the video stream that captures said camera viewpoint comprises synthesizing said viewpoint by processing outputs of a plurality of nearby cameras that capture overlapping views of a desired target.

6. The method of claim 1, wherein selecting the camera configuration based on the first participant configuration and the second participant configuration comprises detecting an opportunity for reconfiguration at one or both of the first endpoint or the second endpoint of the videoconferencing system and prompting a user for initiation of the reconfiguration at one or both of the first endpoint or the second endpoint of the videoconferencing system.

7. The method of claim 1, wherein selecting the camera configuration based on the first participant configuration and the second participant configuration comprises detecting an opportunity for reconfiguration at one or both of the first endpoint or the second endpoint of the videoconferencing system and automatically initiating reconfiguration at one or both of the first endpoint or the second endpoint of the videoconferencing system.

8. The method of claim 1, further comprising:
  determining third participant configuration for a third endpoint of the videoconferencing system;
  selecting the camera configuration for the first endpoint, the second endpoint, or the third endpoint, based on the first participant configuration, the second participant configuration, or the third participant configuration, wherein the first endpoint is comprised of one or more first video displays configured to switchably display video information from one or more second cameras at the second endpoint or video information from one or more third cameras at the third endpoint, the second endpoint is comprised of one or more second video displays configured to switchably display video information from one or more first cameras at the first endpoint or video information from the one or more third cameras at the third endpoint, and the third endpoint is comprised of one or more third video displays configured to switchably display video information from one or more second cameras at the second endpoint or video information from the one or more first cameras at the first endpoint.

9. The method of claim 1, further comprising:
  re-determining the first participant configuration based on the second participant configuration.

10. The method of claim 1, wherein a different perspective of a participant at the first endpoint is displayed on each display at the second endpoint.

11. A multi-endpoint videoconferencing system comprised of:
  a first endpoint of the multi-point videoconferencing system including more than one first endpoint participant and more than one first endpoint video display, each first endpoint video display including one or more first endpoint cameras to capture multiple views of a first endpoint participant viewing the first endpoint display, one or more first positions, and a first presence detector, wherein a first participant configuration is determined for the first endpoint;
  a second endpoint of the multi-point videoconferencing system including more than one second endpoint participant and more than one second endpoint video display, each second endpoint video display including one or more second endpoint cameras to capture multiple views of a second endpoint participant viewing the second endpoint display, wherein the number of captured multiple views of the second endpoint participant is equal to the number of first endpoint displays, and a second presence detector, wherein a second participant configuration is determined for the second endpoint; and
  a processor operably connected with the first presence detector and the one or more first cameras and the second presence detector and the one or more second cameras, wherein the processor is configured to determine a first camera configuration and a second camera configuration by;
  detecting first participants at the first endpoint and second participants at the second endpoint;
  determining whether each of the first positions at the first endpoint is occupied by a first participant and determine whether each of the second positions at the second endpoint is occupied by a second participant; and
  determining a current camera viewpoint for each of the one or more first cameras at the first endpoint and determine a current camera viewpoint for each of the one or more second cameras at the second endpoint.

12. The multi-endpoint videoconferencing system of claim 11, wherein determining camera configuration of one or more of the first endpoint or the second endpoint based upon the first participant configuration or the second participant configuration comprises enabling, disabling or switching between camera viewpoints of one or more of the one or more first cameras at the first endpoint or the one or more second cameras at the second endpoint.

13. The multi-endpoint videoconferencing system of claim 11, wherein determining camera configuration of one or more of the first endpoint or the second endpoint based upon the first participant configuration or the second participant configuration comprises one or both of mechanically reorienting one or more first cameras at the first endpoint from their current camera viewpoint such that they are substantially directed toward occupied first positions or mechanically reorienting one or more second cameras at the second endpoint from their current camera viewpoint such that they are substantially directed toward occupied second positions.

14. The multi-endpoint videoconferencing system of claim 11, wherein determining camera configuration of one or more of the first endpoint or the second endpoint based upon the first participant configuration or the second participant configuration comprises switching at one or both of the first endpoint or the second endpoint a source of a video stream from a first viewpoint that shows one of the first positions or one of the second positions to a second viewpoint that shows a different one of the first positions or a different one of the second positions.

15. The multi-endpoint videoconferencing system of claim 11, wherein determining camera configuration of one or more of the first endpoint or the second endpoint based upon the first participant configuration or the second participant configuration comprises enabling, disabling or switching between video streams of the one or more first cameras at the first endpoint or the one or more second cameras at the second endpoint.

16. The multi-endpoint videoconferencing system of claim 11, wherein determining camera configuration of one or more of the first endpoint or the second endpoint based upon the first participant configuration or the second participant configuration comprises a processor configured to detect an opportunity for selecting camera configuration at one or both of the first endpoint or the second endpoint of the multi-endpoint videoconferencing system and prompt a user for selection of the camera configuration at one or both of the first endpoint or the second endpoint of the multi-endpoint videoconferencing system.

17. The multi-endpoint videoconferencing system of claim 11, wherein determining camera configuration of one or more of the first endpoint or the second endpoint based upon the first participant configuration or the second participant configuration comprises a processor configured to detect an opportunity for selecting camera configuration at one or both of the first endpoint or the second endpoint of the multi-endpoint videoconferencing system and automatically selecting camera configuration at one or both of the first endpoint or the second endpoint of the multi-endpoint videoconferencing system.

18. The multi-endpoint videoconferencing system of claim 11, wherein determining camera configuration of one or more of the first endpoint or the second endpoint based upon the first participant configuration or the second participant configuration comprises a processor configured to display video videoconference information on M video displays at the first endpoint and display video videoconference information on N video displays at the second endpoint, and M and N are not equal.

19. The multi-endpoint videoconferencing system of claim 18, wherein M is determined by a number of second participants at the second endpoint and N is determined by a number of first participants at the first endpoint.

20. The multi-endpoint videoconferencing system of claim 11, wherein determining camera configuration of one or more of the first endpoint or the second endpoint based upon the first participant configuration or the second participant configuration comprises controlling video streams to and from at least one of the first endpoint and the second endpoint.

21. The multi-endpoint videoconferencing system of claim 11, further comprised of:
  a third endpoint of the multi-endpoint videoconferencing system comprised of one or more third cameras, one or more third video displays, one or more third positions, and a third presence detector, wherein third participant configuration is determined for the third endpoint; and
  wherein one or more camera configurations of the first endpoint, the second endpoint, or the third endpoint of the multi-endpoint videoconferencing system are selected based on the first participant configuration, the second participant configuration, or the third participant configuration.

22. The multi-endpoint videoconferencing system of claim 21, wherein at the first endpoint the processor is configured to switchably display video information from the one or more second cameras or video information from the one or more third cameras, at the second endpoint the processor is configured to switchably display video information from the one or more first cameras or video information from the one or more third cameras, and at the third endpoint the processor is configured to switchably display video information from the one or more second cameras or video information from the one or more first cameras.

* * * * *